United States Patent [19]

Hammerschmitt

[11] 4,390,421
[45] Jun. 28, 1983

[54] SEPARATOR FOR LOW VISCOSITY FLUIDS

[76] Inventor: Nikolaus Hammerschmitt, Kölner Str. 138, D-5350 Euskirchen, Fed. Rep. of Germany

[21] Appl. No.: 253,911

[22] Filed: Apr. 14, 1981

[30] Foreign Application Priority Data

Apr. 14, 1980 [DE] Fed. Rep. of Germany ....... 3014204
Jun. 23, 1980 [DE] Fed. Rep. of Germany ....... 3023384

[51] Int. Cl.$^3$ ............................................. B01D 21/10
[52] U.S. Cl. ....................................... 210/86; 210/522
[58] Field of Search ................ 210/800, 801, 804, 85, 210/86, 513, 532.1, 533, 536, 538, 540, 522, 537

[56] References Cited

U.S. PATENT DOCUMENTS

| | | | |
|---|---|---|---|
| 1,069,789 | 8/1913 | Kelley, Jr. | 210/534 |
| 1,505,841 | 8/1924 | Alexander | 210/801 |
| 1,708,235 | 4/1929 | Nugent | 210/86 |
| 2,232,709 | 2/1941 | Luetgert | 210/51 |
| 3,862,040 | 1/1975 | Preus | 210/253 |

FOREIGN PATENT DOCUMENTS

| | | |
|---|---|---|
| 503336 | 7/1930 | Fed. Rep. of Germany. |
| 651986 | 10/1937 | Fed. Rep. of Germany. |
| 686444 | 12/1939 | Fed. Rep. of Germany. |
| 586728 | 10/1953 | Fed. Rep. of Germany. |
| 1038683 | 9/1958 | Fed. Rep. of Germany. |
| 1484845 | 9/1969 | Fed. Rep. of Germany. |
| 2201273 | 7/1972 | Fed. Rep. of Germany. |
| 2536644 | 2/1977 | Fed. Rep. of Germany. |
| 2610773 | 9/1977 | Fed. Rep. of Germany. |
| 2800061 | 7/1978 | Fed. Rep. of Germany. |
| 86277 | 6/1964 | France. |
| 52314 | 7/1966 | German Democratic Rep.. |
| 542154 | 11/1973 | Switzerland. |
| 1234022 | 6/1971 | United Kingdom. |

Primary Examiner—Ivars C. Cintins
Attorney, Agent, or Firm—Andrus, Sceales, Starke & Sawall

[57] ABSTRACT

The present invention relates to an apparatus for continuously separating a fluid mixture, for example, oil, water, as well as also slurry, and for continuous separate discharge of the fluids and harmless removal of the solid portion.

The invention is based on the principle that the fluid mixture is conducted in the vertical direction in such a manner, that by the downward flow, flow free zones develop on the opposing sides of deflectors, in which the low viscosity fluid (oil) rises and forms a specified height oil column in the collecting chamber.

The oil column so appears, as a result of a turbulence effect of the separator, to the water surface, that with a density of 0.85, 15% of the oil column floats above the water surface and 85% sinks under the water surface.

These 15%'s are used for the continuous draining without the water flowing off with it. The oil outlet lies, for example, only 1 cm above the highest possible water level, the oil column under the water surface amounts to 5.6 cm before the oil discharge.

Through the arrangement of a submerged second water surface independent from the water surface fluctuations this spacing is considerably increased.

With obstructions in the oil discharge (filled tank, blocked pipe, etc.) the oil level in the oil collection chamber sinks and flows through the immersion pipe of the oil safety discharge in a reserve tank; through this the oil alarm is tripped.

22 Claims, 37 Drawing Figures

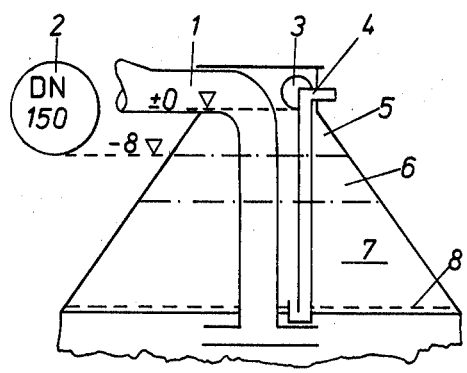
Fig. 3
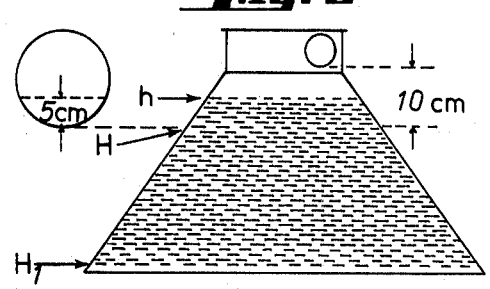
Fig. 6"
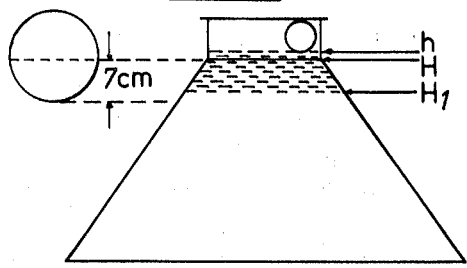
Fig. 4
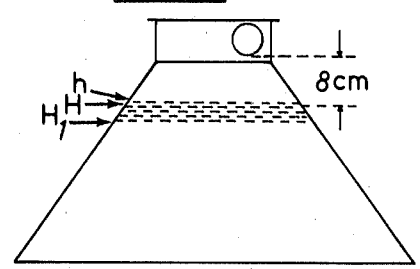
Fig. 4'
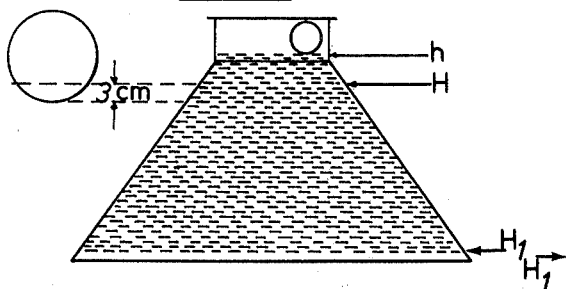
Fig. 5
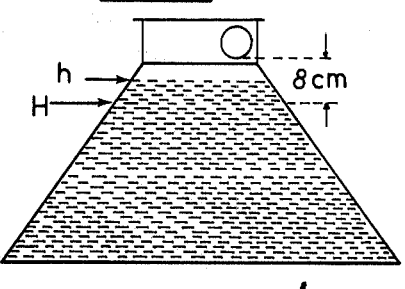
Fig. 5'
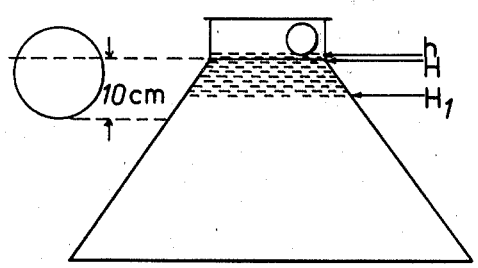
Fig. 6
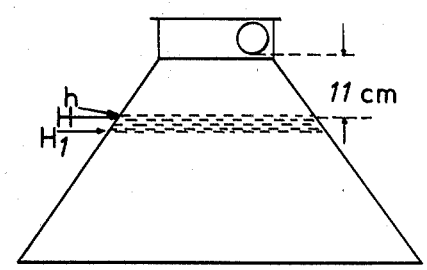
Fig. 6'

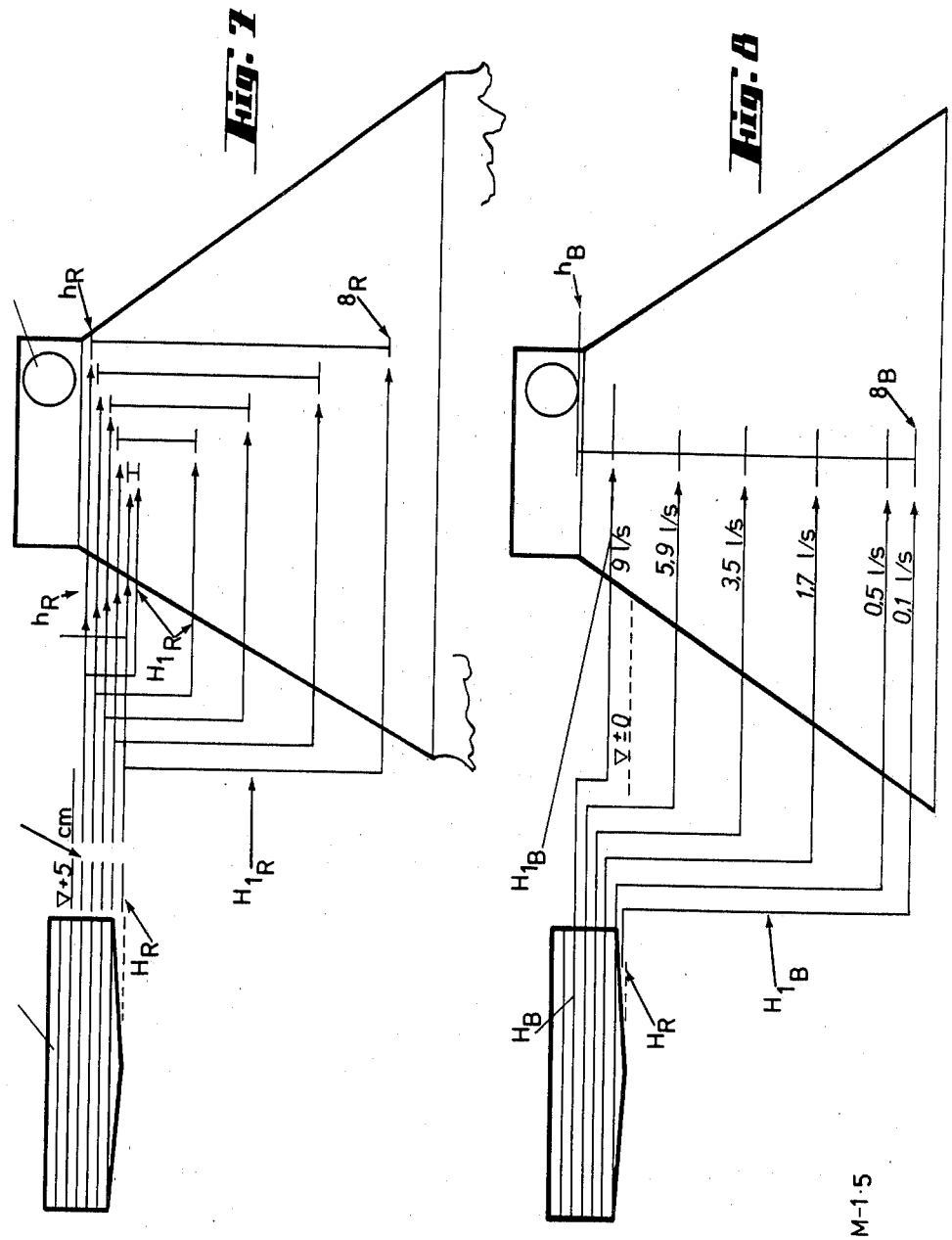

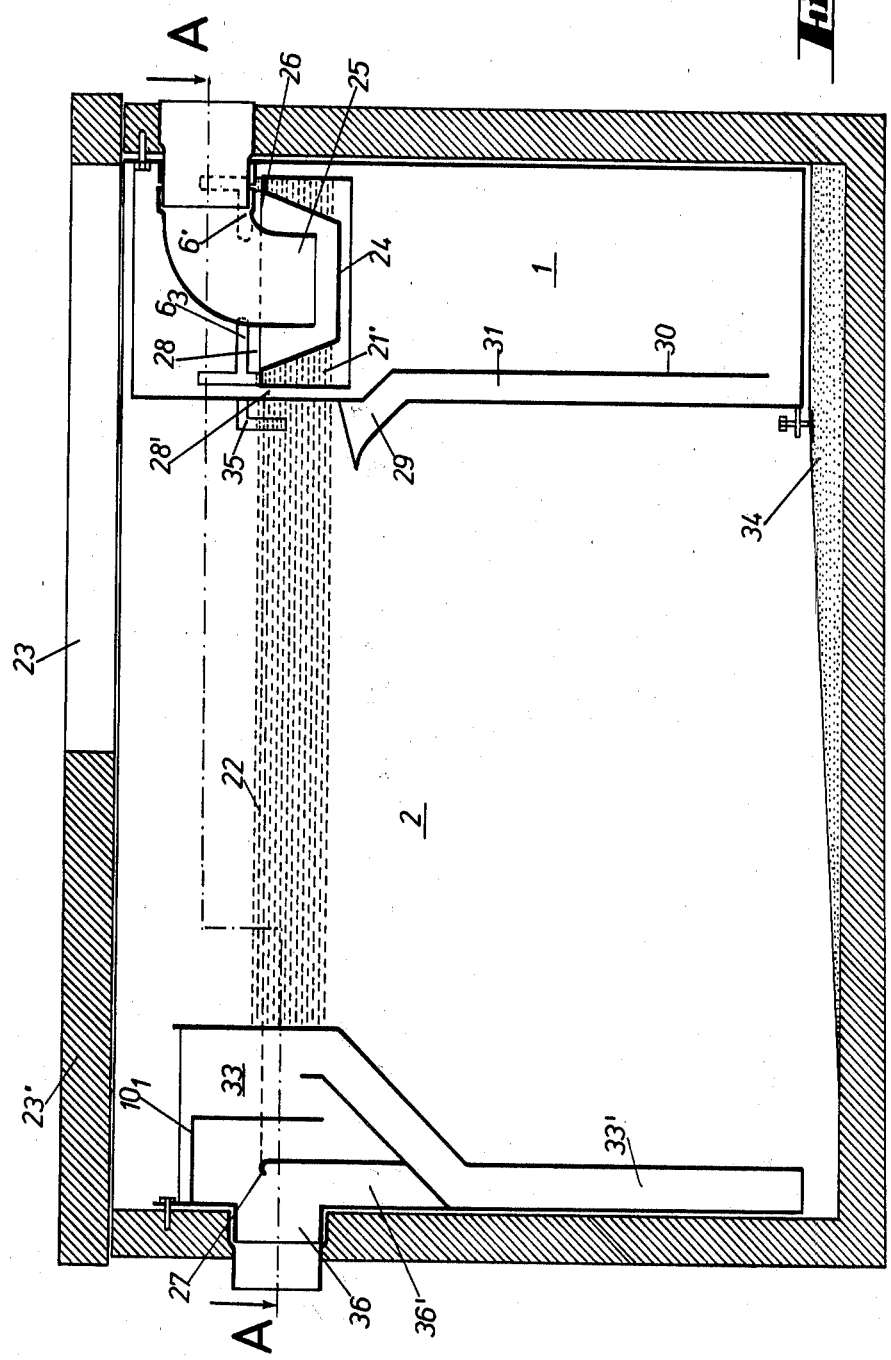

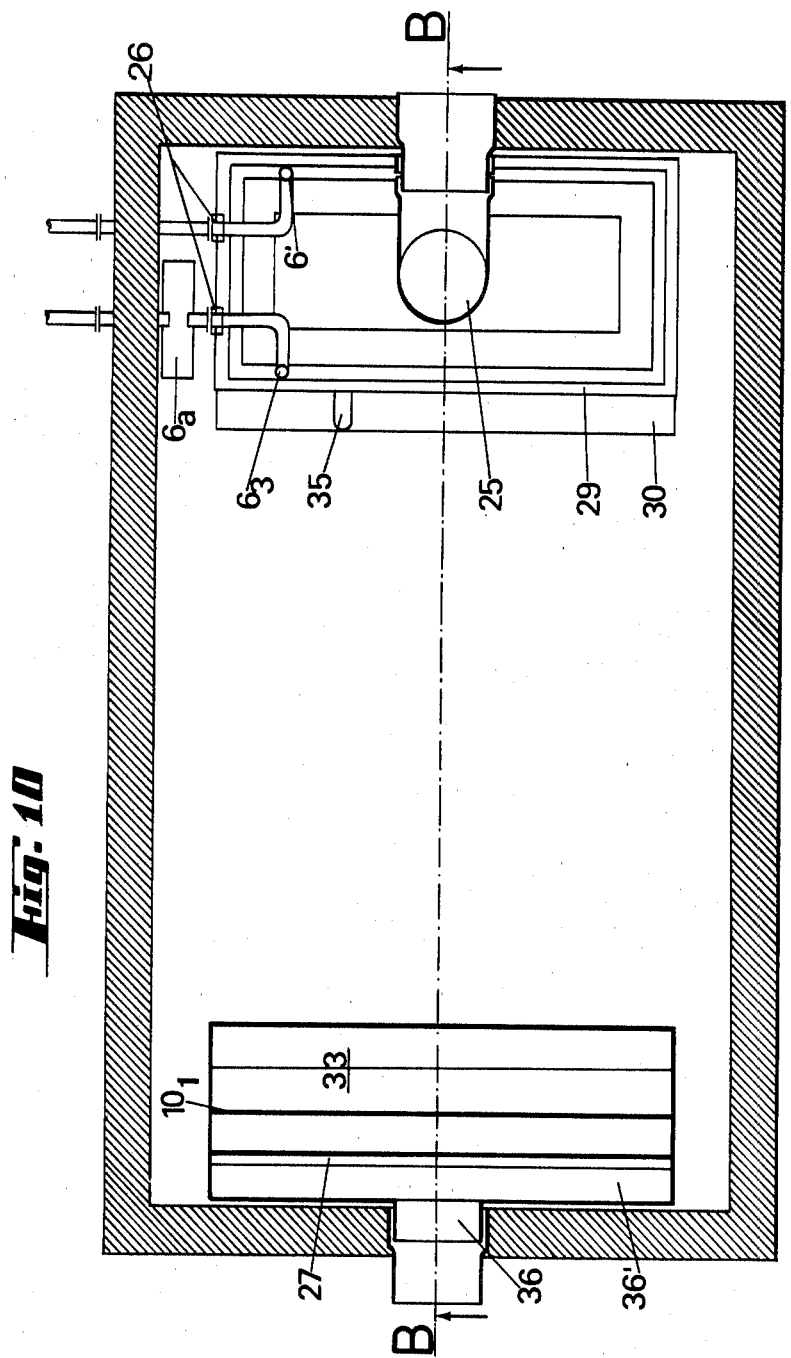

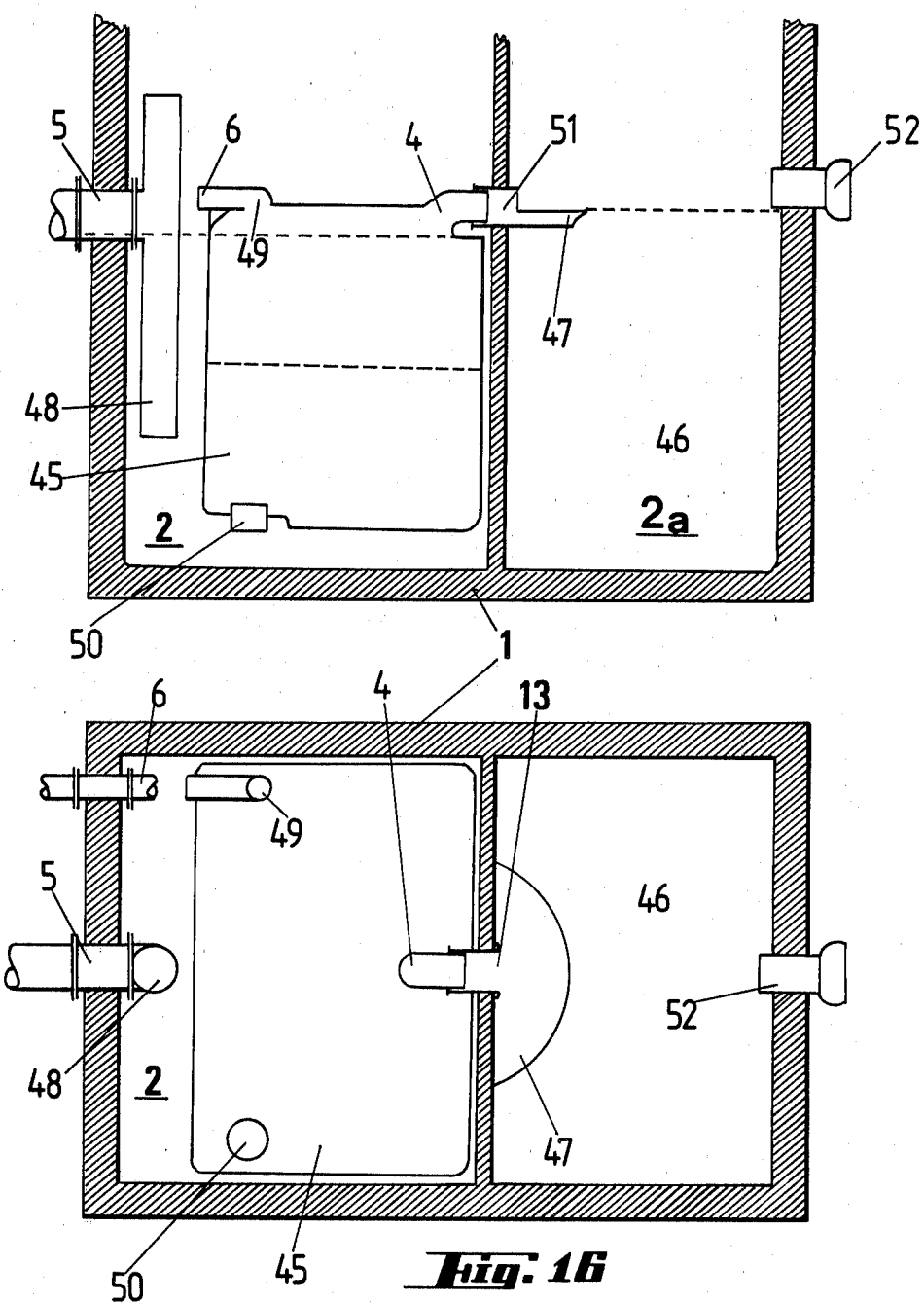

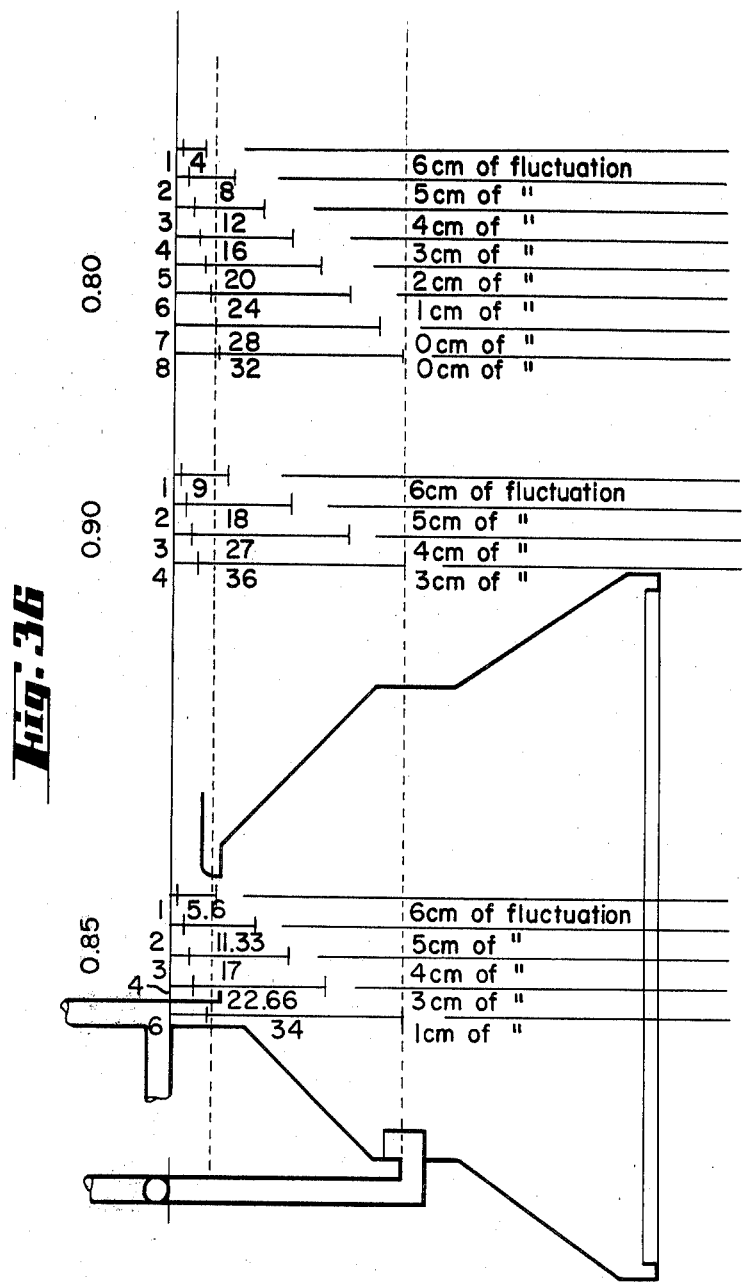

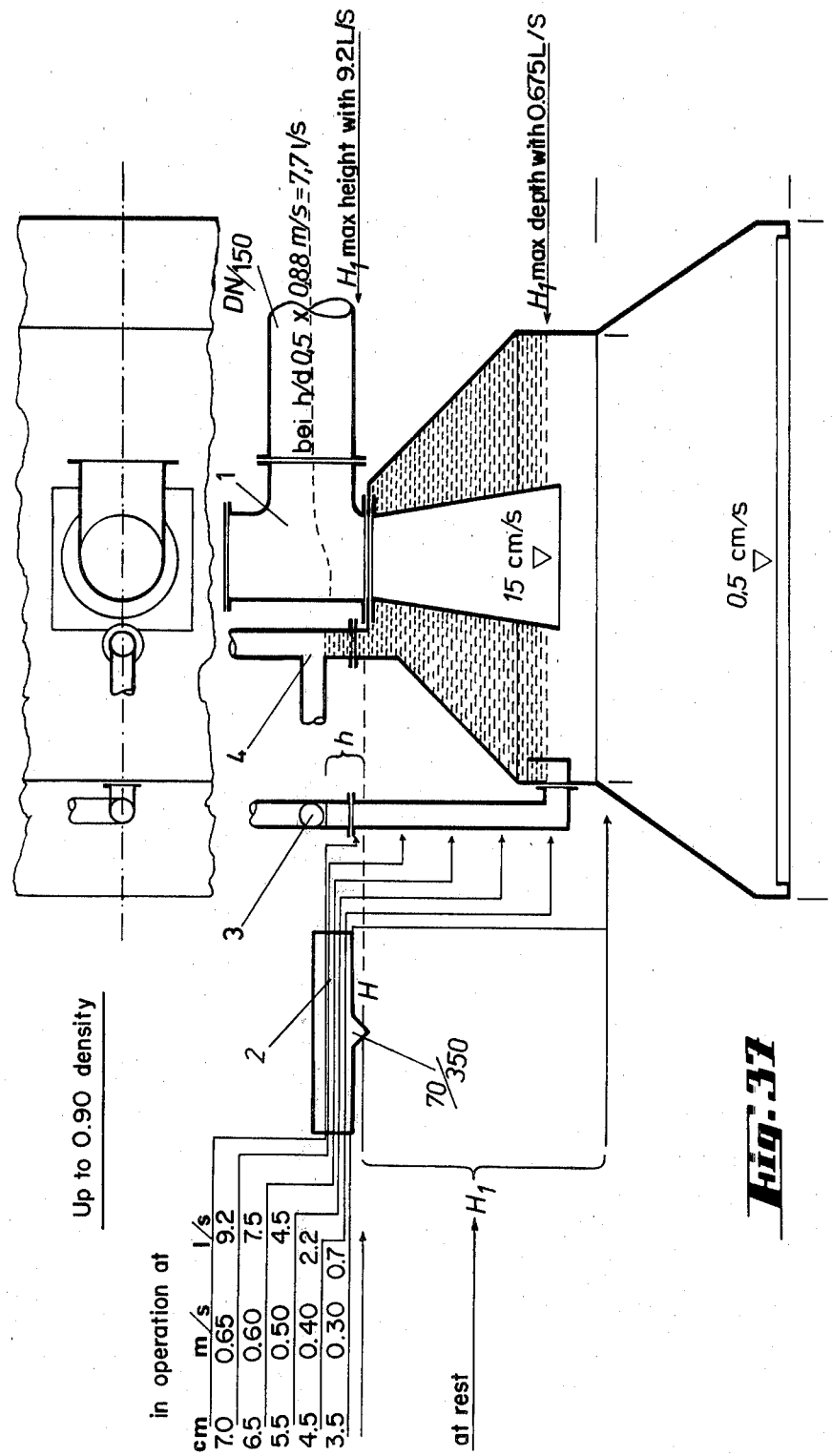

SEPARATOR FOR LOW VISCOSITY FLUIDS

BACKGROUND OF THE INVENTION

The present invention is concerned with a separating apparatus that in that capacity serves to separate a mixed fluid formed of a dense liquid, medium density liquid, and low density liquid from each other and to separately discharge the fluids.

As this apparatus predominately finds use where mineral oil-production plays a role, these components for the separation apparatus will be indicated summarily with oil, water, and slurry.

SUMMARY OF THE INVENTION

For the evaluation of a separator is, in a first instance, the efficiency decisive. No less important are discharge water contaminations for which other factors are responsible, for example, automatic shut-off, maintenance work, unreasonable manipulation, etc. The existence of an automatic shut-off is responsible for all sorts of pollutions. Therefor with the development of the new separator it is an object to provide a continuous oil discharge that offers assurance of certain, unobjectionable oil discharge.

Briefly, in the present invention, separation is obtained by different velocities of flow in the separator. An oil-water mixture is introduced into a first separation chamber. The liquid mixture is directed substantially vertically downwardly by a deflecting surface that can be the wall of a tube or a deflecting member. The deflecting surface provides a relatively narrow sectional area of flow which is abruptly enlarged at the lowest point of the deflecting surface. By this change in the flow area, the velocity of flow is abruptly reduced so that the first separation step can take place.

On the side of the deflecting surface opposite to the liquid flow, a quiescent area is provided that is free of flowing liquid and defines a collecting chamber for the oil. The oil may be continuously discharged at the upper end of the collecting chamber.

The water flows from the tube into a water storing chamber that works as a second separation chamber. If desired, a third oil separator may be utilized in the form of a baffle plate or dip tube in the water storing chamber.

The separator of the present invention functions in a continuous manner without the necessity of any pump or other lifting means. It is further capable of functioning in the face of large water level variations.

BRIEF DESCRIPTION OF THE DRAWING

FIGS. 3 through 6" are schematic diagrams showing operation of the separator including water surface fluctuations and the respective oil levels with a round water discharge.

FIGS. 7 and 8 are schematic diagrams showing the operation of the separator including water level fluctuations with a rectangular water discharge.

FIG. 9 is a cross sectional side view of a modified separator of the present invention taken along the line B—B of FIG. 10.

FIG. 10 is a cross sectional top view taken along the line A—A of FIG. 9.

FIGS. 15, and 16 show yet another modification of the separator of the present invention having a replaceable canister for the collection of oil.

FIGS. 36 and 37 show operation of the separator when subjected to various oils of various weights.

DESCRIPTION OF THE PREFERRED EMBODIMENTS

Figure 1:
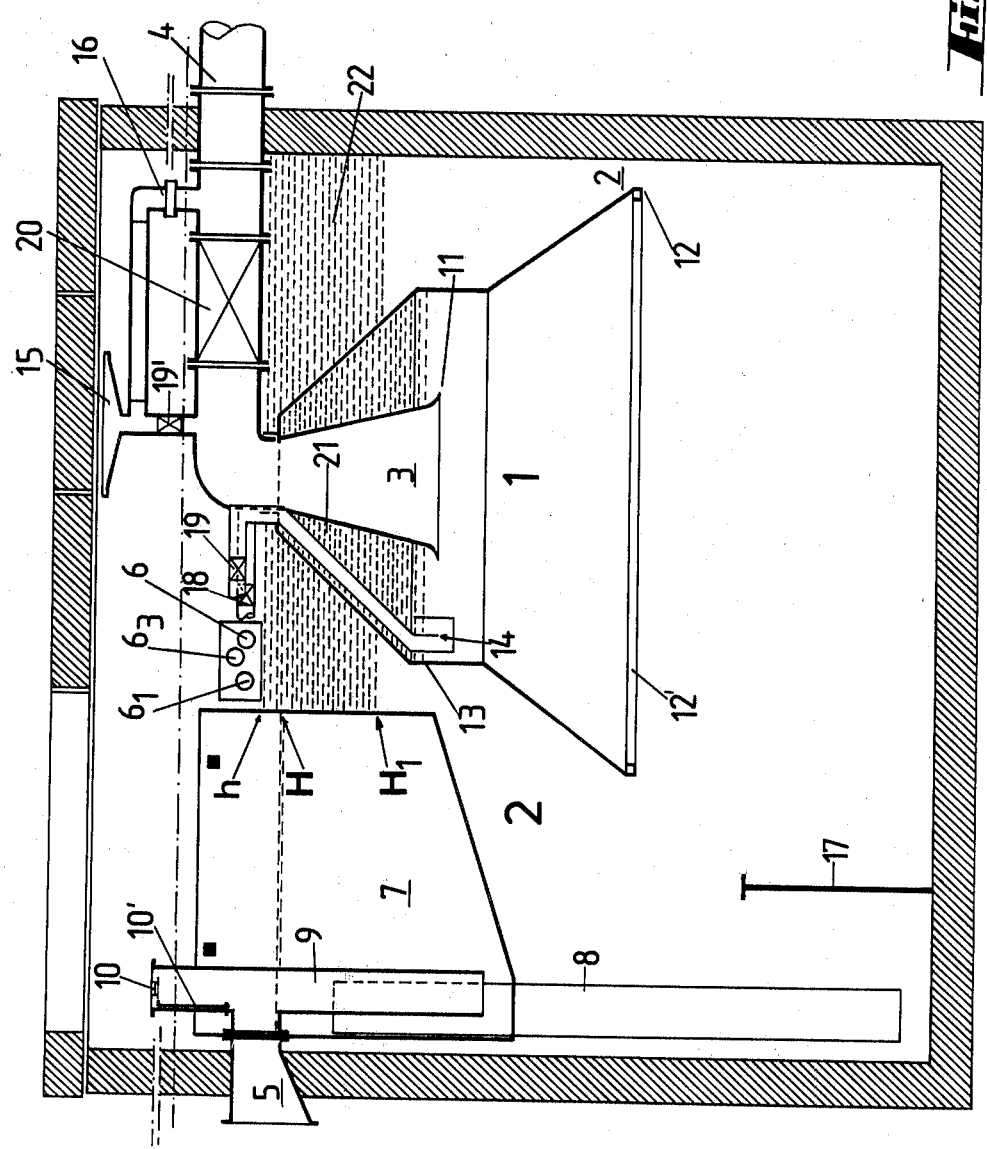
FIG. 1 is a cross sectional side view of the separator of the present invention.

In connection with the operation of the separator of the present invention must be noted, that for example, heating oil with a density of 0.85 rises only 15% above the exposed water surface (water discharge) and sinks 85% beneath the exposed water surface and displaces the water volume in the same amount. However, the setting from 15 to 85 is not fixed according to volume but rather according to the oil column height, as the volume above the water surface would amount to 1% and under the water surface 99%. This is made clear in FIG. 1; inside of the dome, the large volume is in the lower region of the dome; outside of the dome the larger volume is in the upper region. This FIG. 1 shows the oil relationships in the condition of rest of the separator, after an existing longer time, small amounts of mixed fluids would be supplied to the separator or only oil is added. One can flow into the separator in this situation only approximately 0.5 liters/second, the oil flows out initially forcefully, then however the discharge diminishes and adapts itself to the supply (see FIGS. 3–8). Here are the respective oil levels with the operation and in the rest condition of the separator evident.

The oil level outside of the dome behaves the same, although here the greater volume resides in the upper region. Only in the condition of rest does the lowest level of oil outside of the dome sink deeper than inside of the dome, because through the cessation of the water surface fluctuations the oil amount through lowering in the dome takes on a larger cross-section, outside of the dome however it takes on a smaller cross-section. In order to achieve the oil quantity outside of the dome, as for example in FIG. 1, however a half to 1 year will pass depending on the flow because only the component parts, which are specifically denser than the average of 0.85 density arrive in the region outside of the dome.

The oil discharge for the region outside of the dome has, however, only significance as assurance, that the service intervals are prescribed at least half yearly, whereby all oil must be removed out of the separator.

Figure 11:
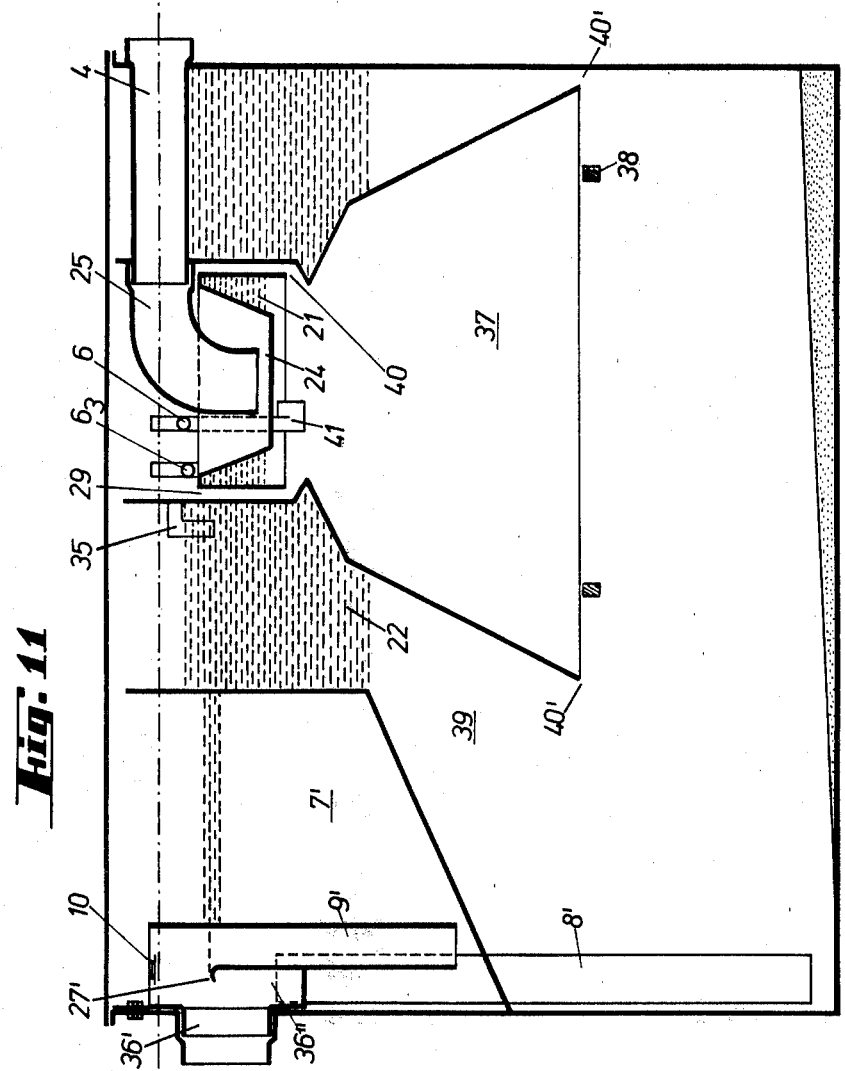
FIG. 11 is a side view of a modified separator of the present invention.

For the case in which residual oils are retained in the water, as is apparent in the FIGS. 1 and 11, a residual oil separator 7–7' is provided, that only as required—or as supplementary—need be introduced.

Through the immersion pipe 8 the water from the base of the separator arrives in the container 7. On the upper surface or to the already existing oil film, the fine oil particles contained in the water are connected and hold themselves literally above the water. From the bottom of the residual separating container 7, the cleaned water is supplied through a T-formed immersion pipe 9 with a rectangular cross-section to the discharge water channel. The transistion portion from a rectangular to a normally round canal pipe is sharply narrowed toward the channel. In this way the discharge is accelerated, the suction that develops mitigates the fluctuations.

On the cover of the immersion pipe a check valve 10 is arranged through which a suction of the water—with perhaps oil quantities—in the residual oil separator is prevented.

The low separating wall 17 in front of the immersion pipe serves the purpose of protecting the slurry from the discharge.

The safety discharge $6_3$ establishes the predetermined lower oil level. If the oil discharge is interrupted on some otherwise specified grounds, the oil lower level sinks in the dome. The oil runs under the overflow edge 9 in the safety discharge 14 and arrives through the higher lying safety discharge $6_3$ in the reserve tank. On the way to the reserve tank an oil alarm is tripped by the discharging oil—by means of a warning apparatus; so that without interrupting the operation the failure can be removed. With service work, the shut-off valve outside of the separator on the water discharge 5 is closed (perhaps through reversing of the reversing closure) and so much water supplied until the oil layer inside and outside of the dome is drained. Then the valves in the oil discharge 18–19 are closed and residual oil quantities conducted through further lifting of the water surface with water from the mains above the suction funnel 15 and the return pipe 16 in the inlet beyond the previously closed valve 20. After the end of the maintenance work, this oil dirtied water is fed back to the separator.

At a distance from the outer walls of the separator, dome 2 lying on brackets (which are not shown) serves as the main separator and continuous oil discharge.

Through the funnel shaped expansion of the supply pipe 3 the velocity of flow is reduced, it is however, stronger than the buoyancy speed of the oil.

On the lower edge of the funnel shaped supply pipe 11, the velocity of flow is so far diminished through the very large dome diameter 1, that the oil can rise. In the region of the supply flow, the rise is laterally deflected, so that the oil in the quiet zone can rise annularly about the supply pipe 3.

A further speed stop is effected by the lower dome rim 12. At this point however further proportionately light oil particles climb on the inner wall of the dome upwardly in the oil collection space 21. Specifically somewhat heavier micro particles however float slowly upwardly in the vertical directions in the perfectly quiet zone in the oil collection space 22. After a period of time, an oil layer concentrates there that, after attaining a determined layer thickness, is discharged into an old oil tank. Through the pyramidal construction of the oil collection space 21 are the unavoidable fluctuations to a great part neutralized with respect to the lower oil level 13.

An oil volume on the upper rim of the dome takes on a layer thickness of 6 cm, specifically according to the decline of the fluctuations, while in the rest condition of the separator only a height of 6 mm (see also in this connection the illustration of FIGS. 4 and 6).

Only with small flows of long duration can the oil height 8 be attained.

In the representation of FIG. 4 is it clear that with a fluctuation of 7 cm (FIG. 4) and 10 cm (FIG. 6) the distance from $H_1$ to h amounts to 6.6 cm, before the water surface reaches the oil discharge 6 in the dome.

Assuming the fluctuations (and therewith the flow quantities) would lie below 3 or 5 cm for a very long time, without large fluctuations resulting in the intervening period, the oil, after attaining of an oil lower level, flows out over the safety discharge 14.

After increases of the supply quantities, in a short time approximately 70 liters of oil can be drawn out of the oil collection space 21 in the oil tank. If after several seconds the warning device does not cease (optical or acoustical), a blockage exists in the oil discharge.

In FIGS. 3–7, examples are shown of water surface fluctuations and the respective oil levels with a separator with pyramidal oil space 21 and round water discharge cross section.

FIGS. 7 and 8 show examples of possible water level fluctuations, if a rectangular water discharge cross section 5 is used.

In FIG. 7 the respective oil columns (oil surface h to oil base $H_1$) are shown. In this connection "R" means separator in the rest condition after flow in l/s shown in FIG. 8.

The lines inside and outside of the discharge cross section 5' ($H_R$ to 5 cm) indicate the water level fluctuations outside of the dome and $H_1$ inside of the dome.

In FIGS. 7 and 8 the respective oil columns (oil surface H to oil base $H_1$) are shown. B stands in this connection for "separator in operation".

With the lines in the rectangular discharge cross section 5' are possible fluctuations 1–7 cm outside of the dome indicated. The water level inside of the dome is identical with the oil base. Here one appreciates clearly that with the indicated discharge cross section with fluctuations of 0 to 5 cm, transient amounts of 0–9 l/s can result, without the water level attaining the oil discharge h and the oil column $H_1$ falling short of the oil lower level (8B).

Figure 2:
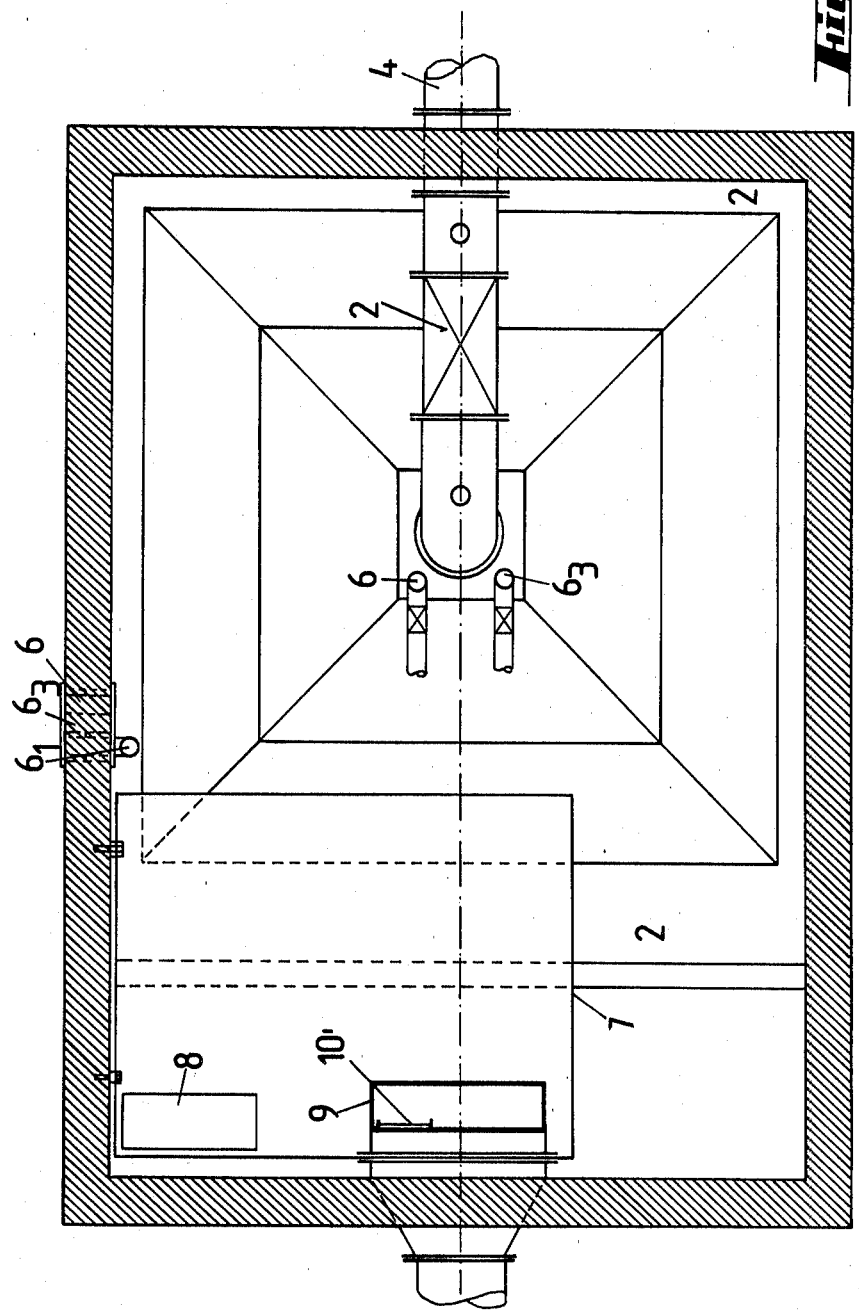
FIG. 2 is a cross sectional top view of the separator of FIG. 1.

With the separator of FIGS. 1–2 is concerned a combination separator, that is, slurry and oil separator as a unit. According to the current evaluation however for example, with an oil separator of the size 6 and automatic wash apparatus of high pressure wash apparatus is prescribed a sludge trap of at least 5,000 l. In order the new evaluation to be correct for an oil separator of the side 6 is once more required at least 2,500 l capacity.

A combination of both units would be functionally and economically the most reasonable.

Obviously, the combined separator can also be employed without changes of the current evaluation, if the previously described sludge trap is constructed as with another separator.

The following described separators made the coupling of a sludge trap compellingly necessary, thereby corresponding to the current evaluation.

As FIG. 1-2 so also the device of FIGS. 9-10 is also divided in 3 stages. In contrast to the combination-separator, this requires however the coupling of a sludge trap.

The stages are the first course or main separator, second stage fine separator, and third stage or residual separator.

The assemblies can be subsequently be emplaced after the completion of the main body through the chute of 1 m φ (23). With small separators the elements of steel can be firmly fastened with the main body through utilization of the outer walls.

In order to sharply reduce the inlet speed, a double walled basin in tray form is provided so that on the underside on 4 sides develops a continuous pyramidal cavity 24.

Alternative embodiments see FIGS. 25-30.

The assembly 24 lies on two rails (which are not shown) and is after turning or removing of the inlet elbow 25 and loosening of the oil pipe screw couplings 26 easily removable, so that the maintenance is facilitated.

The water discharge in the sluice 27 is installed deeper than the basin sluice 24. In this connection, two water levels, 28-28'' develop.

The supply of the oil dirtied discharge water occurs through the inlet 25 in the basin sluice 24 and passes the channel 25 on all four sides. With the emergence out of this channel, the speed is so strongly throttled that the oil separates from the water and rises upwardly in the central flow free zone in the pyramidal oil collection space 24 under displacement of the water.

After attaining the oil discharge 26 lying higher with respect to the viscous fluid discharge, the oil flows continuously out, and according to the fluctuations also intermittently, in an oil tank ouside of the separator. For the determination of the height of the oil discharge, the water surface fluctuations must be taken into consideration.

The water runs under the separating wall 30 and rises upwardly with increasing speed in the chute 31, whereby the specifically heavier particles (as the average for example 0.85 density) are connected with the oil layer in the second stage and are thus held above the water. Above all, however these micro-components parts are now found above and no longer need to rise upwardly against the flow.

In the second stage 2 results the fine separation. Therefore also this stage is so measured in size that here the low descending speed of 0.25 cm/S with a flow of 6 l/S is achieved.

The process is based among other things in that the fluids to be separated are moved in vertical and not in horizontal directions.

A uniform speed appears to me with larger cross-sections in the horizontal direction impossible, particularly with respect to the oil particles contained in the water, the reason being that the particles almost without weight in the water float more in the horizontal direction than in the vertical direction. Therefore in the present invention, value would thus lie, to retain the oil fraction on the water surface or to carry them there with the flow in order to save them an ascent against the flow.

The slanting plane 34 at the bottom of stage 2 is intended for a uniform precipitation of the water. The third stage 33 (if it is required) works according to the same system as the second stage.

The safety discharge 35 is (in case required) so arranged that by means of a short oil pipe elbow 35 the oil is returned in the first stage. The oil drain off can however also result from the outside of the reserve tank.

Through the forwardly extending collection chamber, which develops through the sluice 27 and lowering of the discharge 36, that is larger in cross section than the inlet 25, the fluctuations in the water surface are very small and are reduced in their negative effect through the lowering of the second water surface 28-28'.

The half round bevel 27 on the discharge sluice produces a suction, accelerating the discharge and contributing therewith to the diminuation of the fluctuations.

The oil safety discharge lies higher than the normal discharge. If the oil normal discharge is obstructed, the oil layer rises and flows out of the oil safety discharge in a reserve tank.

Figure 12:
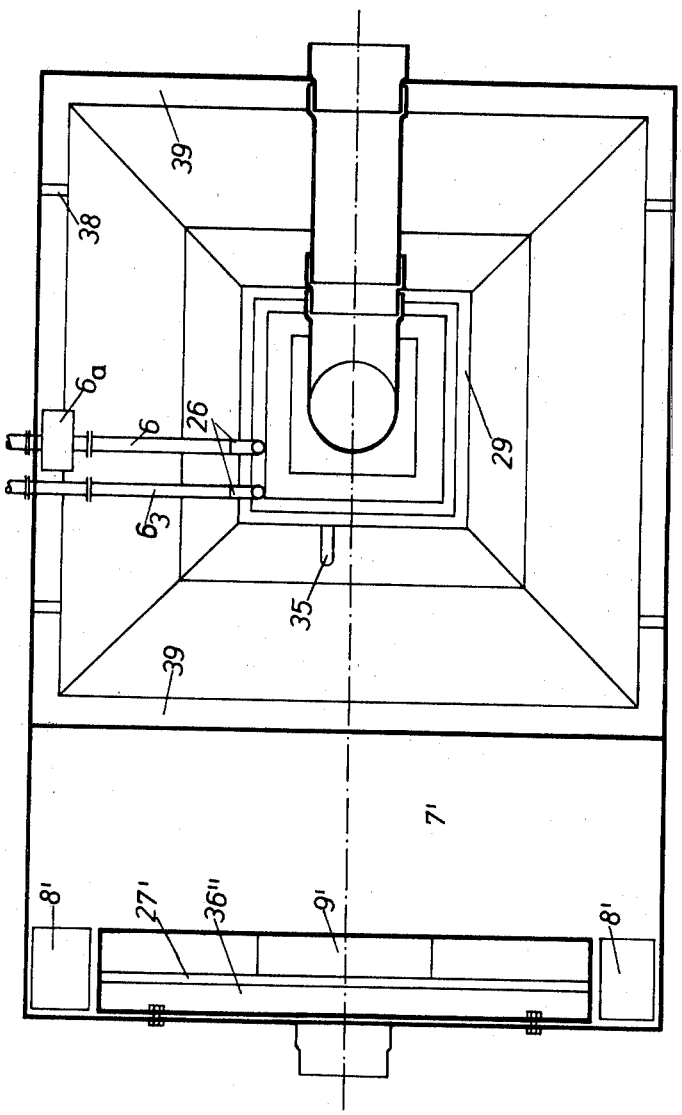
FIG. 12 is a cross sectional top view of the separator shown in FIG. 11.
Figure 13:
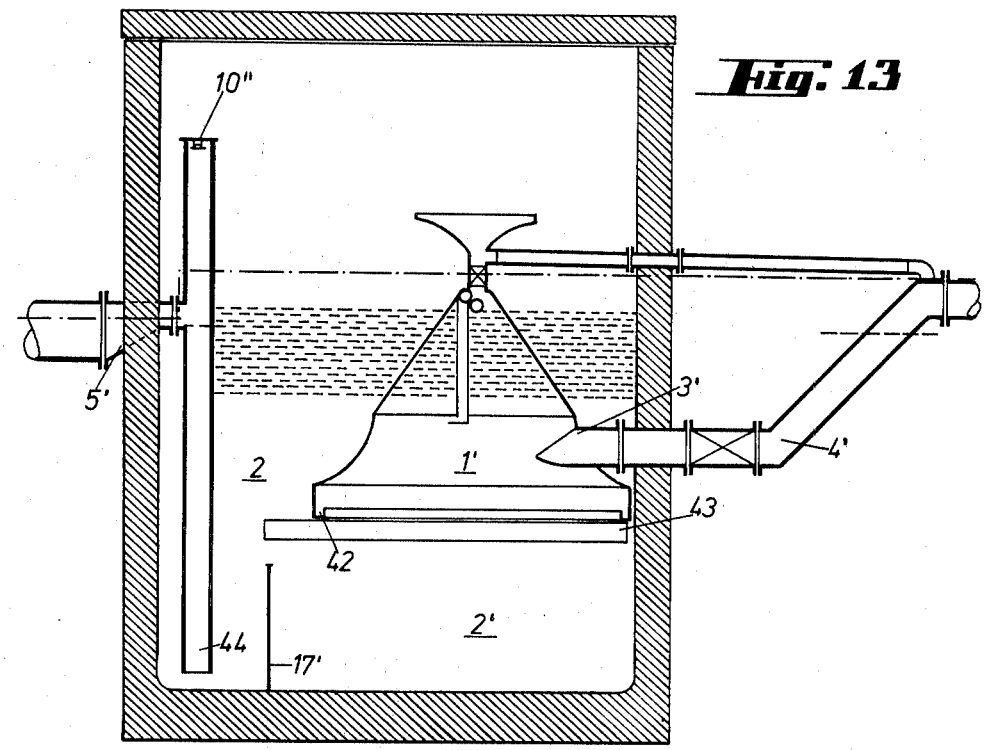
FIGS. 13 and 14 are cross sectional side and top views, respectively, showing a further modification of the separator of the present invention.
Figure 14:
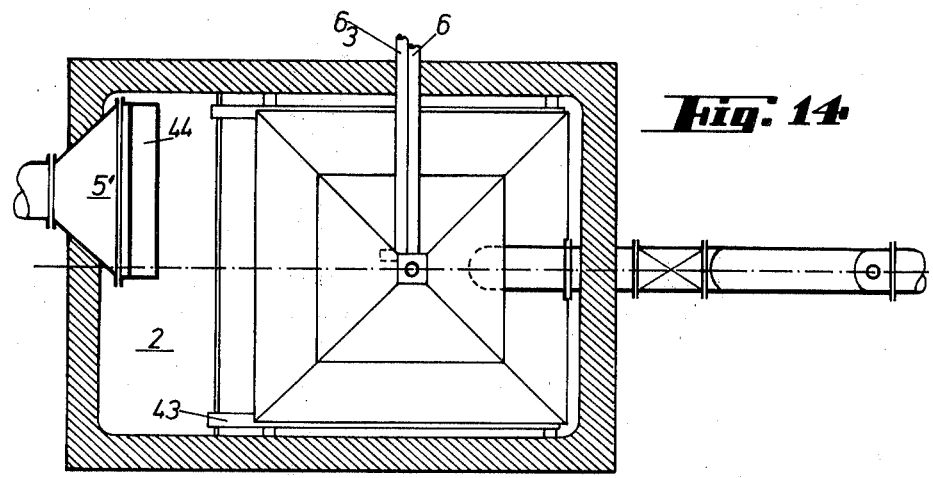

FIGS. 11-12 show an exemplary embodiment in a steel embodiment. In this connection the immersed dome 37 comes into use as a first stage. This is supported on two bars 38 at a predetermined distance 40' from the outer walls 39. For the inlet the four-sided, speed throttling, basin sluice 24, described in FIGS. 9-10 would be selected.

The safety discharge results in this connection by means of the immersed pipe 41 and functions according to the same process as already described in FIGS. 1-2.

FIGS. 13-14.

With this separator the inlet is laterally mounted under the oil collection space. The oil component existing in the discharge water should be led here in the oil layer in the main stage 42 and joined thereby with the oil layer. In other respects, this separator works according to the same process as described in FIGS. 1-2.

FIGS. 15-16.

According to the environmental consideration the evidence against the consumption of old oil established. Consequently that means that each individual auto owner and also others are obligated to this step.

The exemplary embodiment shown in FIGS. 15-16 and 17-18 offer the ability to make such decisions feasible.

The main feature of this separator lies in that the flow of the water occurs through a replaceable canister 45 provided with a lowered opening. The discharge water arrives from the sludge trap 46 through the canister 45. The water flows out of the lowered opening through the submerged pipe 48 in the channel while the oil remains in the canister.

With the servicing, initially the oil film in the sludge trap 46 is brought to the outflow through a small supply of clear water in the separator container 45. As is apparent in the section view the edge on the suction baffle plate 47 is rounded off half round. The base of this plate lies deeper than the water surface. Through the developed suction action the upper surface is freed of oil residue in a short time.

After the lowered opening 50 is closed on canister 45, the same can, after loosening of the screw couplings, be removed with the oil content and delivered to the oil collection place.

Figure 17:
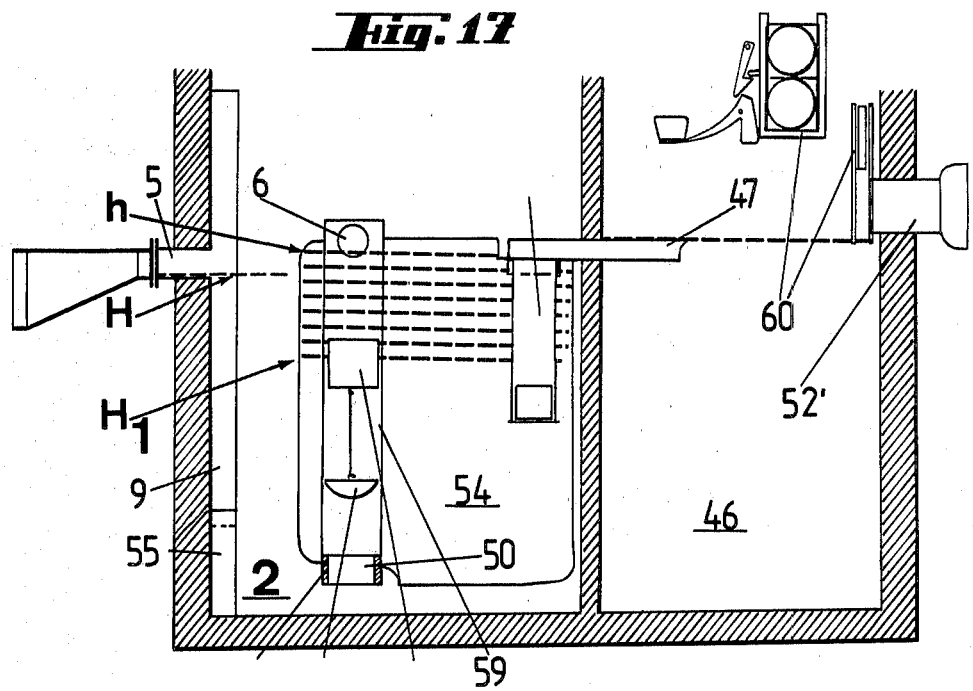
FIGS. 17 and 18 show a further embodiment of the present invention utilizing a canister.
Figure 18:
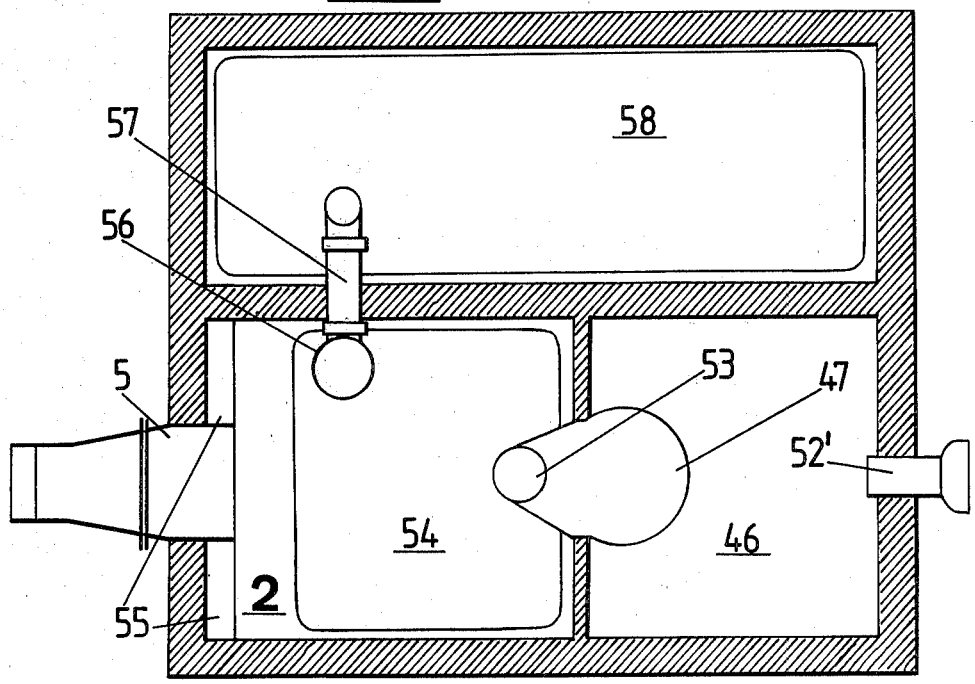
Figure 19:
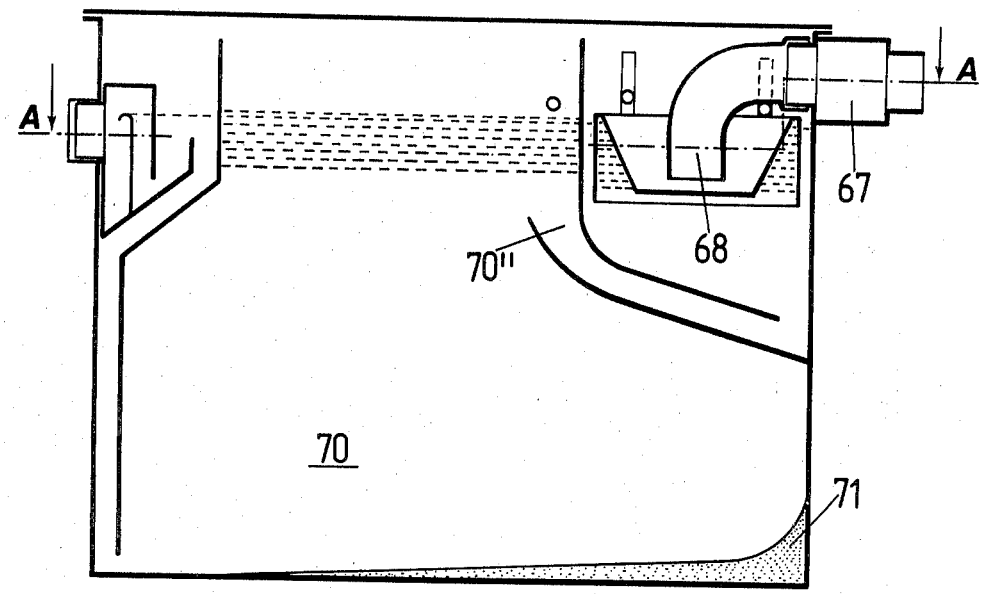
FIGS. 19 and 20 show a further modification of the separator shown in FIGS. 9 and 10.
Figure 20:
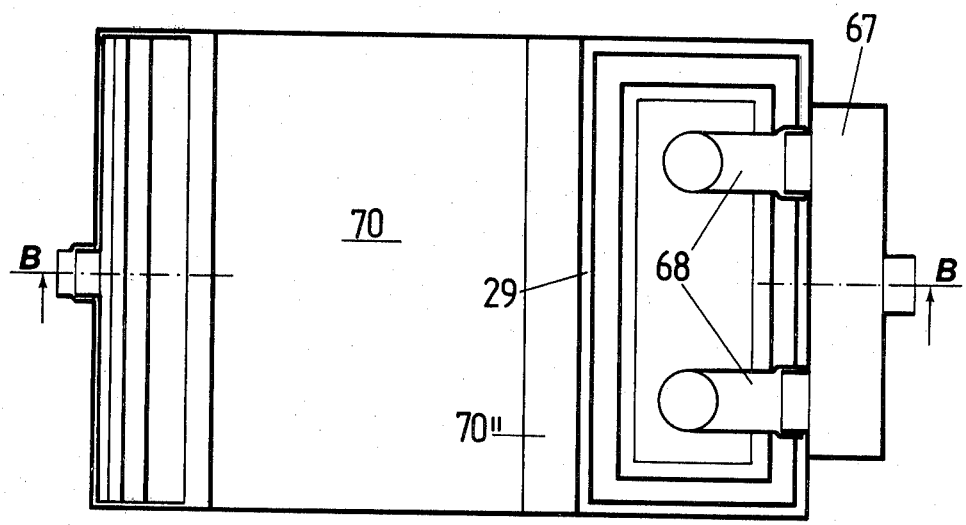
Figure 21:
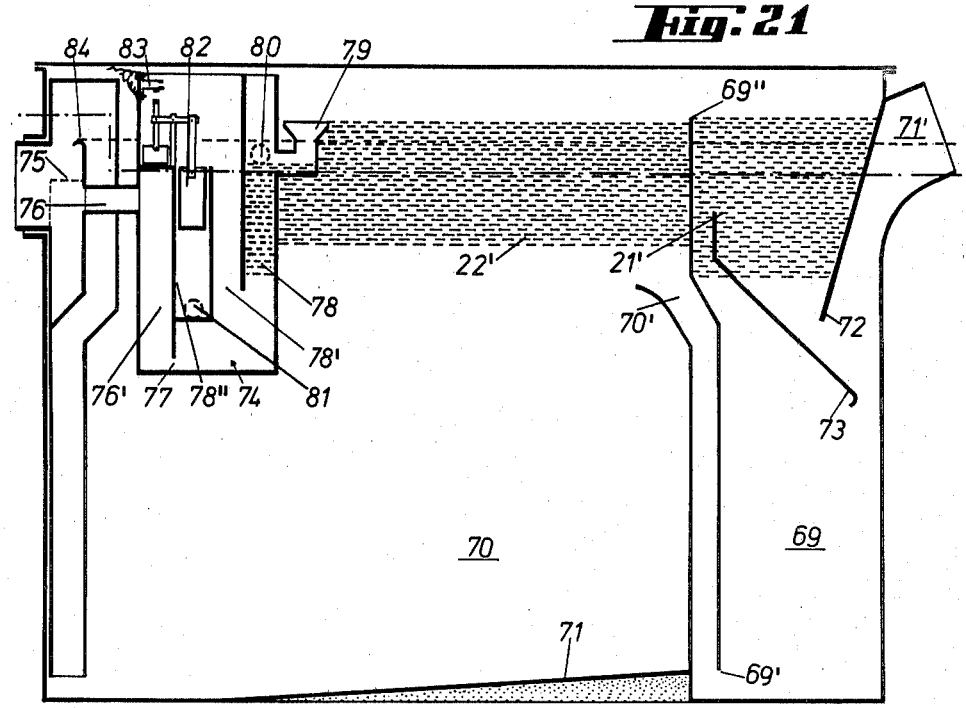
FIGS. 21 and 22 show yet another modification of the separator of the present invention.
Figure 22:
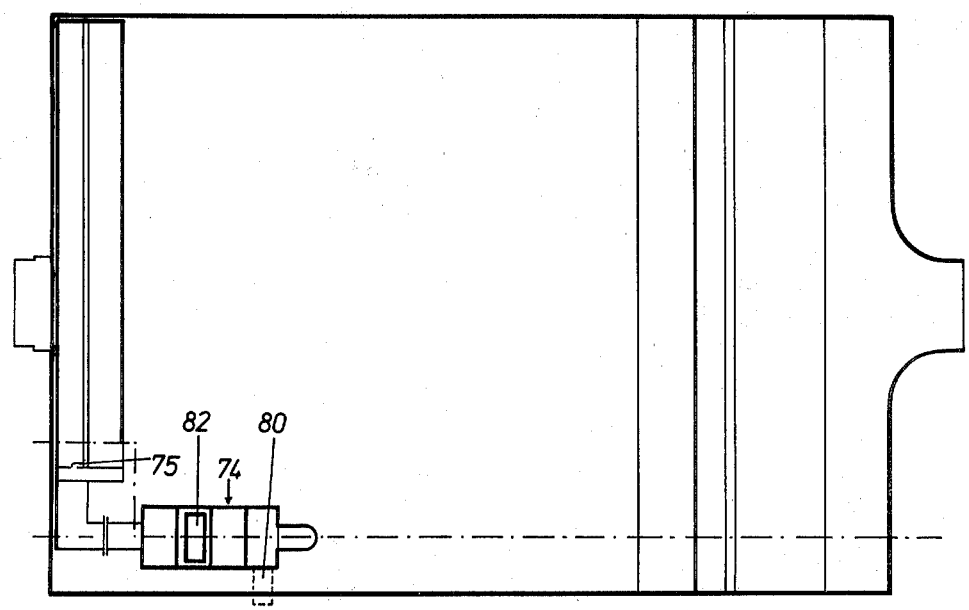
Figure 23:
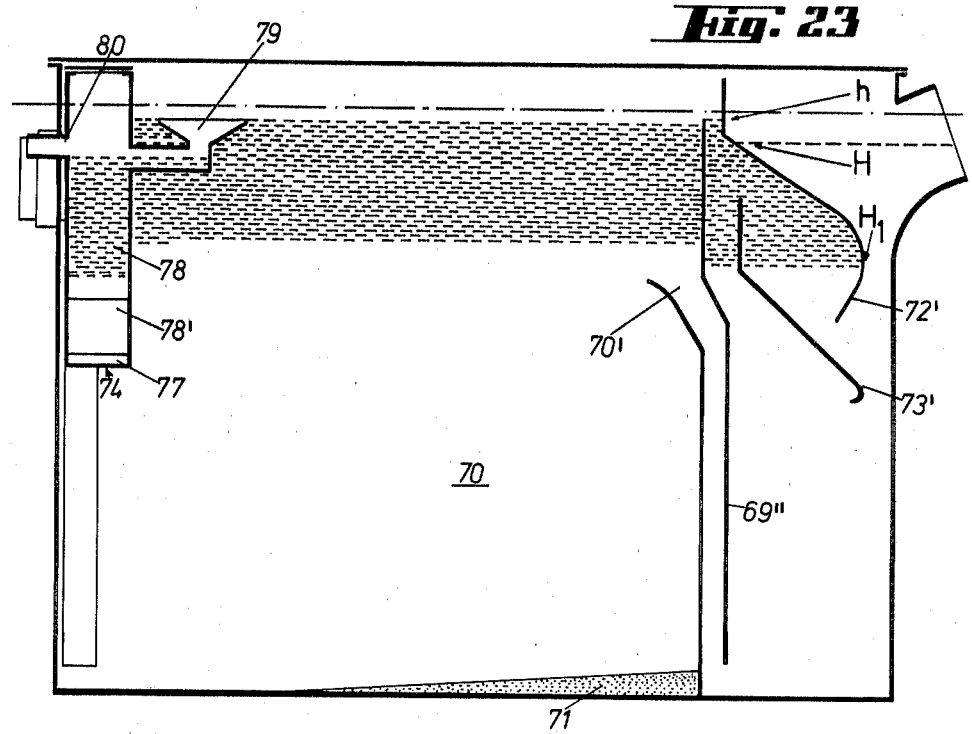
FIGS. 23 and 24 show a modified separator in which the first separating stage is provided with an outer flow discharge as compared to the inner flow discharge with the dome-embodiment of FIG. 1.
Figure 24:
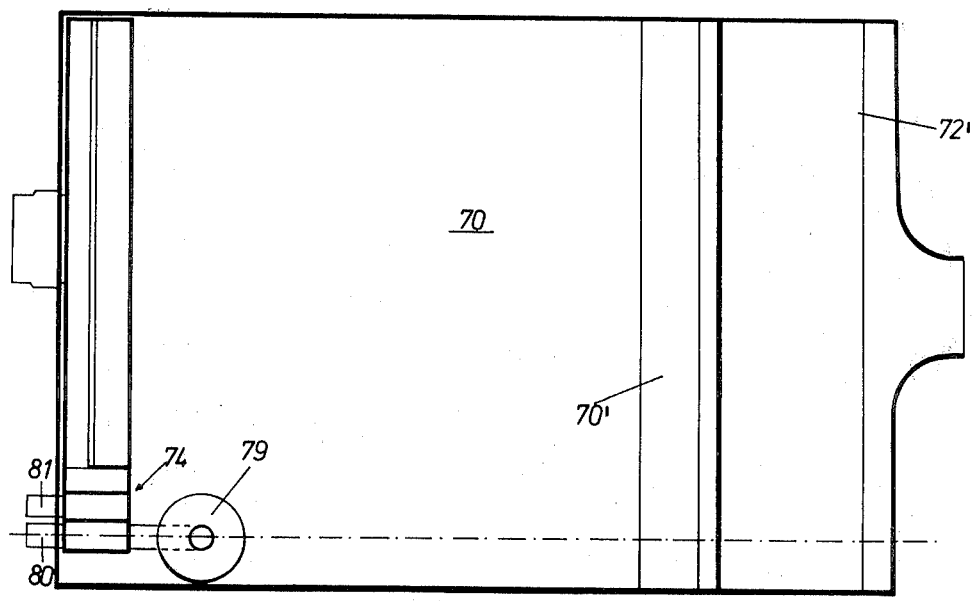
Figure 25:
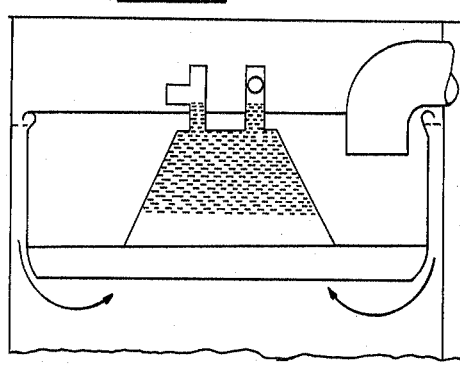
FIGS. 25 through 30 show modifications to the separator shown in FIGS. 1 and 2 and 9 and 10.
Figure 26:
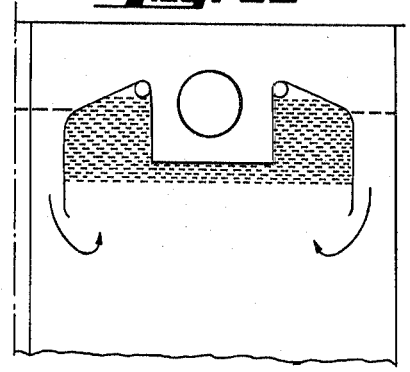
Figure 27:
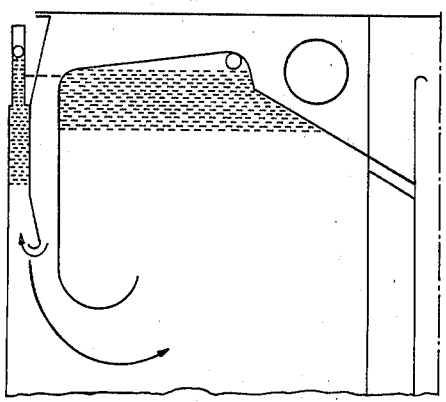
Figure 28:
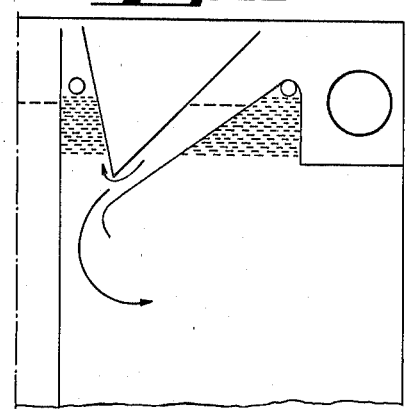
Figure 29:
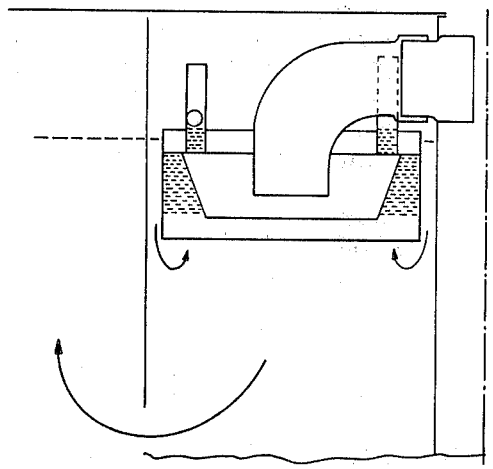
Figure 30:
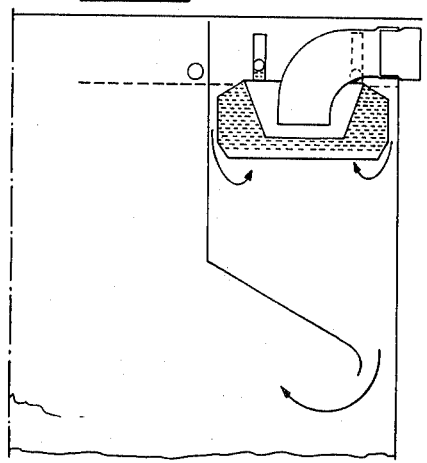

The reserve canister 58 with FIGS. 17-18 naturally has no lowered opening and can, after the loosening of the inlet screw coupling, be removed. In FIG. 17 two automatic closures 58 and 59 are shown. The function of these self-actuating closures is generally known. The small flow quantities guarantees a sufficient effectiveness.

FIGS. 19–20.

This separator works according to the system of the separator of FIG. 9–10, is additionally provided with a roof-like hood, that serves for the drainage of the oil into the reserve tank, (not shown) and is provided with twin inlets 67–68.

FIGS. 21–22.

This separator is considered for middle sizes. The essential feature of this separator is the oil storage with safety discharge 74 mounted at a deeper level. The water connection 77 for this oil storage is connected through a chute with a channel or a pipe conduit 76 with the antechamber in the discharge 75. In this way is it independent of the flow. Therefore the fluctuations have no influence on the low lying level of the oil storage 77. Laterally of the sluice 84, small water quantities come from above in the oil discharge and safety system, whose always unchanging level is determined from the overflowing edge 75.

The water reaches to the inlet 71 in the first stage of the separator. On the end of the oil separating wall 72, the greatest part of the oil is separated and rises in the oil collection chamber 21'.

On the lower end of the deflector 73 results a speed stop in the lower bevelling through the suddenly larger occurring cross section, whereby further oil fractions can rise without counterflow on the opposing side of this deflector 37. The viscous liquid falls downwardly at slow speed in the first separating stage, 69 runs under the lower end of the separating wall 69' and rises with somewhat increased speed in the second separating stage 70. With the discharge out of the chute 70' the flow arrives against the underside of the oil collection space 22', whereby the micro-particles contained in the flow connect with the oil layer. The advantages of this separating stage are already described in FIGS. 9–10. A third separating stage (residual separation) is not shown in this exemplary embodiment but, can however be provided as additionally required.

The essential features with this separator are the deflectors 72 and 73, through which the desired speed stop is achieved and the flow free zone is thus enclosed. A further features is the oil safety discharge with warning apparatus occurring in a low lying water surface level.

When the highest oil film thickness is attained, as shown in the exemplary embodiment 21–22, the oil flows out through a funnel 79 with oil discharge 80 in the old oil tank (collection tank). If the oil discharge 80 is on some basis obstructed, the oil column 79 in the safety discharge is formed from below, runs under the separating wall and rises in column 78'. After also here a determined oil column has collected, the oil arrives from above in the basin 82, whereby through the raising mechanism the oil alarm is tripped. The oil overflowing in the cup flows out through the discharge 81 in the oil collection tank outside of the separator.

This separator 21–22 differs from those previously described in that the oil in the first separating stage is not discharged directly in the tank but rather flows over an oil separating wall 69" or wall opening in the second stage. This overflow edge 69" is positioned somewhat higher than the oil surface-level in the second stage. This is also apparent through the different oil layer thicknesses. It is to be noted however, that in the exemplary embodiment the highest attainable oil layer thickness is represented and can only be attained when previously for some time only small quantities have flowed through the separator.

FIGS. 23–24.

Also with this separator, the first separating stage is provided with outer flow discharge, in contrast to the inner flow discharge with the dome-embodiment of FIG. 1; that is, the fluid is led through pipes of various different forms (inner flow discharge).

Otherwise the flow discharge occurs as in FIG. 11. Here is concerned a combination embodiment and indeed we have here an outer flow discharge through the channels while normally with flow discharge through the channels there exists an inner flow discharge. These channels however surround the flow free space; it is by contrast reversed. In the lower part of the dome is concerned an inner flow discharge. With the inner flow discharge a favorable result must always be obtained because the flow free space is considerably greater.

Whether with the disclosed exemplary embodiments a discharge with round or rectangular cross section, or whether a sluice is used, depends on the size of the separator or on the construction embodiment. However, according to the combination, one or other can be appropriate.

The fluctuations are dependent on the volumetric efficiency of the inlet and outlet pipes. In order to reduce these water level fluctuations to the unavoidable, they are led through a sluice in an expansion chamber. The wider this sluice is constructed, the less are the fluctuations.

The discharge pipe is preferably larger and essentially deeper constructed than the inlet pipe. The unavoidable fluctuations lie however outside of the actual separator. In any case they are harmless for the function of the separator.

The unavoidable fluctuations inside of the separator are now determined from the width of the sluice.

| FIG. | Number | Designation |
|---|---|---|
| 1–2 | 1 | Inlet Dome (main separator, 1st stage) |
|  | 2 | Fine separator (2nd stage) |
|  | 3 | Inlet flow pipe |
|  | 4 | Supply main |
|  | 5 | Discharge nozzle (round or rectangular) |
|  | 6 | Oil discharge (1st stage) |
|  | $6_1$ | Oil discharge (2nd stage) |
|  | $6_3$ | Safety discharge |
|  | 7 | Residual separator |
|  | 8 | Immersion pipe for the residual separator |
|  | 9 | Immersion pipe-water discharge |
|  | 10 | Venting valve |
|  | 10' | Reversing valve |
|  | 11 | First speed stop |
|  | 12 | Second speed stop |
|  | 12' | Oil drip gutter |
|  | 13 | Oil discharge border |
|  | 14 | Oil safety discharge |
|  | 15 | Oil suction funnel |
|  | 16 | Oil return conduit |
|  | 17 | Slurry dividing wall |
|  | 18 | Oil discharge valve |
|  | 19 | Oil safety discharge valve |
|  | 20 | Mixed water-inlet valve |
|  | 21 | Oil collection chamber (1st stage) |
|  | 22 | Oil collection chamber (2nd stage) |

| Examples of the oil characteristic with an assumed density of 0.85 | | | |
|---|---|---|---|
| FIG. 3 | | 1 | Inlet |
| | | 2 | Water discharge |
| | | 3 | Oil discharge |
| | | 4 | Oil safety discharge |
| | | 5 | Partial volume 5.2 Ltr |
| | | 6 | Partial volume 11.1 Ltr |
| | | 7 | Total volume 70.8 Ltr |
| | | 8 | Oil lower level (max.) |
| | | ±0 | Inlet pipe-base |
| | | −8 | Discharge-dense liquid |
| FIG. 4 | | | |
| Separator in operation with 7 cm water level fluctuations | h | | Oil surface in the oil discharge 1 cm oil column above the water surface |
| | H | | Water surface outside of the dome or water discharge pipe base |
| | $H_1$ | | Water surface inside of the dome or oil base, oil column under the water surface 5.6 cm |
| FIG. 4 | | | |
| Separator in the condition of rest after 7 cm water surface fluctuations. Spacing of the oil discharge-water discharge 8 cm. | h | | 0.45 cm oil column above the water surface |
| | H | | Water surface outside of the dome or water discharge pipe base |
| | $H_1$ | | Water surface inside of the dome or oil base. Oil column beneath the water surface 2.55 cm |
| FIG. 5 | | | |
| Separator in operation with 3 cm water surface fluctuations (long term) | h | | Oil surface in the oil discharge 5 cm above the outside water surface |
| | H | | Water surface outside of the dome with 3 cm water surface fluctuations |
| | $H_1$ | | Water surface inside of the dome or oil base. Oil column under the water surface 28.3 cm. |
| FIG. 5' | | | |
| Separator in the rest condition after 3 cm water surface fluctuations. Spacing oil discharge-water discharge 8 cm | h | | Oil surface 4.5 cm above the water surface |
| | H | | Water surface outside of the dome or water discharge pipe base |
| | $H_1$ | | Water surface inside of the dome or oil base. Oil column under the water surface 25.5 cm |
| FIG. 6 | | | |
| Separator in operation with 10 cm water surface fluctuations | h | | Oil surface 1 cm above the external water surface |
| | H | | Water surface outside of the dome or discharge pipe-base |
| | $H_1$ | | Water surface inside of the dome or oil base. Oil column under the water surface 5.6 cm |
| FIG. 6' | | | |
| Separator in the condition of rest after 10 cm water surface fluctuations. Spacing of oil discharge-water discharge 11 cm | h | | Oil surface above the outer water surface 0.4 cm |
| | H | | Water surface outside of the dome or discharge pipe-base |
| | $H_1$ | | Water surface inside of the dome or oil base. Oil column under the water surface 2.4 cm |
| FIG. 6'' | | | |
| Separator in the rest condition after 5 cm water surface fluctuations. Spacing of oil discharge-water discharge 10 cm | h | | Oil surface above the outer water surface 4.1 cm |
| | H | | Water surface outside of the dome or discharge pipe-base |
| | $H_1$ | | Water surface inside of the dome or oil base. Oil column under the water surface 23.2 cm. |

Assumed density of 0.85
Determination of the oil column above or below the water surface according to the following formula: $(h:15) \times 85 = H_1$  $(H_1:85) \times 15 = h$

| FIG. | | Designation |
|---|---|---|
| 3–$6_2$ | | Schematic representation with round discharge cross section |
| 7–8 | | Schematic representation with rectangular discharge cross section |

| | FIGS. 7 + 8 | |
|---|---|---|
| 1 | | Oil collection space |
| 2 | | Cross section of the water discharge |
| 3 | | Oil discharge |
| $h_R$ | | Oil surface in the condition of rest of the separator fluctuating however according to the flow of the fluid quantities |
| $H_R$ | | Water surface outside of the dome in the condition of rest of the separator |
| $H_{IR}$ | | Water surface or oil base in the dome in the condition of rest of the separator |
| $8_R$ | | Oil lower level in the rest condition of the separator after 0.5 1/S flow quantities |
| $8_B$ | | Oil lower level-separator in operation after 0.1 1/S flow quantities |
| 10 | | Water surface fluctuations outside of the dome in dependence on the flow quantities |
| $h_B$ | | Oil surface in the operation of the separator (Oil discharge) |
| $H_B$ | | Water surface fluctuations in dependence on the flow quantities in the discharge cross-section |
| $H_{1B}$ | | Water surface or oil column in the dome however after flow quantities in the operation of the separator |

| FIG. | Number | Designation |
|---|---|---|
| 9–10 | 1 | Separation stage (main separation) |
| | 2 | Separation stage (fine separation) |
| | 6' | Oil discharge |
| | $6_3$ | Oil safety discharge |
| | $10_1$ | Odor trap |
| | 21 | Oil collection space (1st stage) |
| | 22 | Oil collection space (2nd stage) |
| | 23 | Control man hole |
| | 24 | Inlet sluice |
| | 25 | Inlet elbow |
| | 26 | Oil pipe threaded joint |
| | 27 | Water discharge |
| | 28 | Water surface ahead of the inlet sluice |
| | 28' | Water surface behind inlet sluice (lowered) |
| | 29 | Inlet channel |
| | 30 | Separating wall (1st stage) |
| | 31 | Supply chute for the 2nd stage |
| | 33 | Residual separation |
| | 33' | Immersed shaft to the water discharge |
| | 34 | Sloped plane |
| | 35 | Safety discharge (2nd stage) |
| | 36 | Water discharge |
| | 36' | Discharge collection basin |
| | $6_a$ | Warning device |
| | 23' | Covering plate |
| 11–12 | 4 | Supply conduit |
| | 6 | Oil discharge |
| | $6_3$ | Oil safety discharge |
| | $6_a$ | Warning device |
| | 7' | Residual separator |
| | 8' | Immersed pipe for the residual separator (dual construction) |
| | 9' | Immersed pipe for the discharge sluice |
| | 10 | Venting-check value |
| | 21 | Oil collection space (1st stage) |
| | 22 | Oil collection space (2nd stage) |
| | 24 | Inlet sluice |
| | 25 | Inlet elbow |
| | 26 | Oil pipe screw joint |
| | 27' | Discharge sluice |
| | 29 | Inlet channel |
| | 35 | Safety discharge (2nd stage) |
| | 36'' | Water discharge-collection basin |

-continued

| FIG. | Number | Designation |
|---|---|---|
| | 36' | Water discharge |
| | 37 | Inlet dome (1st separation stage) |
| | 38 | Support rails |
| | 39 | Separation space (2nd stage) |
| | 40 | First speed stop |
| | 40' | Second speed stop |
| | 41 | Safety discharge |
| 13-14 | 1' | Inlet dome (main separator 1st stage) |
| | 2' | Fine separator (2nd stage) |
| | 3' | Inlet end piece |
| | 4' | Supply conduit |
| | 5' | Discharge connecting piece (rectangular to round) |
| | 10" | Venting valve |
| | 6 | Oil discharge |
| | 6$_3$ | Oil safety discharge |
| | 42 | Oil drip gutter |
| | 43 | Supporting bracket |
| | 44 | Discharge immersion pipe |
| | 2' | Sludge trap |
| | 17 | Slurry separating wall |
| 15-16 | 45 | Oil separator (canister) |
| | 46 | Sludge trap |
| | 47 | Oil suction baffle plate (inlet in separator) |
| | 48 | Water discharge (immersed pipe) |
| | 49 | Oil discharge to the collection tank |
| | 50 | Water discharge (pressure equalization) |
| | 51 | Quick coupling |
| | 52 | Inlet to the sludge trap |
| 17-18 | 52' | Inlet to the sludge trap |
| | 46' | Sludge trap |
| | 53 | Inlet to the separator (canister) |
| | 54 | Canister separator |
| | 55 | Supply to the discharge pipe |
| | 56 | Oil safety discharge |
| | 57 | Discharge to the oil container |
| | 58 | Oil container |
| | 59 | Self actuating shut off |
| | 60 | Self actuating shut off |
| 21-22 | 69 | Main separator (1st stage) |
| 23-24 | 69' | Discharge to the second stage |
| | 70 | Second separator stage |
| | 70' | Supply to the second separator stage |
| | 71 | Sloping discharge plane |
| | 71' | Inlet |
| | 72 | Oil separating wall (deflector) |
| | 73 | Deflector |
| | 74 | Safety discharge with warning device |
| | 75 | Water contribution for lowered water surface |
| | 76 | Connection to the safety discharge |
| | 76' | Pressure equalization column |
| | 77 | Pressure equalization opening |
| | 78 | Oil column to the oil discharge |
| | 79 | Oil inlet to the safety discharge |
| | 80 | Oil discharge to the oil collection tank (outside of the separator) |
| | 81 | Oil discharge from the safety discharge |
| | 82 | Oil detection plate (warning device) |
| | 83 | Oil alarm switch |
| | 84 | Discharge sluice (water discharge) |
| 19-20 | 67 | Distributor for the dual inlets |
| | 68 | Dual inlets |
| | 70" | Pass over to the second stage |
| | 70 | Second stage |
| | 71 | Sloping plane |

Figure 31:
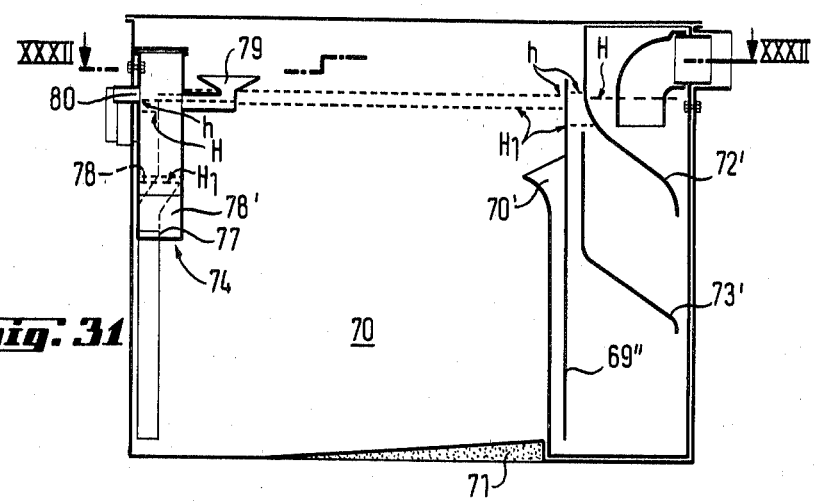
FIGS. 31, 32, and 33 show further modifications of the separator of the present invention.
Figure 32:
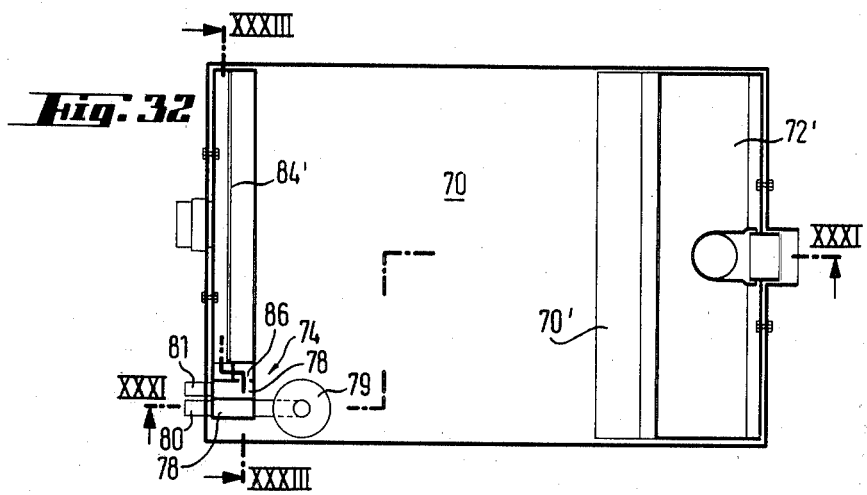
Figure 33:
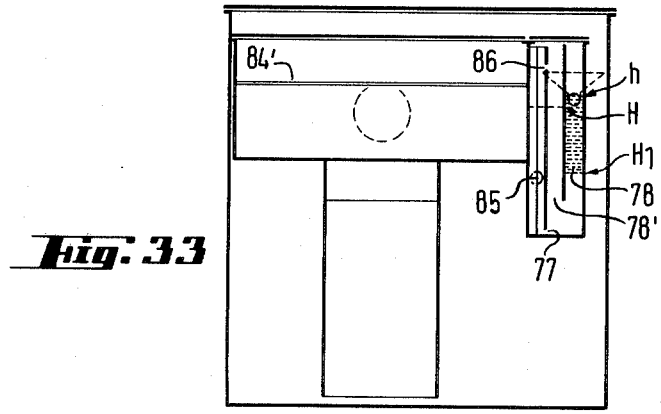

The exemplary embodiment of FIGS. 31, 32, and 33 shows the height of the oil column in the condition of rest after 2½ cm water level fluctuations (see FIG. 31) and in operation after 0.5 cm water level fluctuations (long duration) with an assumed oil density of 0.9 cm (old oil). An overflow height of 2½ cm through the sluice 84' gives a flow of approximately 10 l/s with a speed of 50 cm/s.

In the case in which the separator is supplied with fluids of higher density than 0.90, a second safety discharge is arranged that is adjusted to the oil column depth of the oil collection space. As soon as the oil base reaches the oil discharge 85, the oil flows through the oil discharge 86 and safety discharge column 78 in the reserve tank outside of the separator.

The two security discharges have the advantage that the oil is, if necessary, dewatered. As a possibility the carried along water separates before the oil discharge 80 in the oil column 78.

Supplementary thereto, it is to be pointed out that with higher densities, for example 0.90, the upper oil discharge of the immersed pipe 14 (FIG. 1), 41 (FIG. 11) 4 (FIG. 3) should lie no higher than the normal discharge. A simultaneous oil discharge through the safety discharge in the normal operation is not possible, because the oil can initially flow out through the safety discharge if the oil lower level remains beneath. In this case, a parallel discharge can be desired. The safety discharge without immersed pipe 6$_3$ (see FIGS. 9 and 10) must, in each case, lie higher than the normal discharge.

The normal discharge can also result through the immersion pipe, that is, in a manner reversed from that previously described.

The heretofore representations were all proportioned for a light fluid density of 0.85.

With a fluid density of 0.90 amounts however the oil column 1 cm above the water level and 9 cm below the water level, in contrast to 5.6 cm below the water level with a density of 0.85. Without the safety discharge, the oil condition below the water level would obtain an undesired depth, that this safety discharge is unassurable.

The arranged container in the safety discharge has as its object the following:

1. It is through this possible to allow higher fluctuations, and indeed the oil that with lower fluctuations settles, is diverted in container (5) with the attainment of the depth (10).

2. With the sinking of the water level to the null point, the accumulated oil is reconveyed out of the container (5) in the dome and with the next operation of the apparatus through the raising of the water level arrives in the oil tank outside of the separator through the oil discharge (4).

Through the steady repetition of the water level fluctuations this device acts as a pump.

3. There can be arranged in the container (5) a floating circuit for the alarm apparatus.

Figure 35:
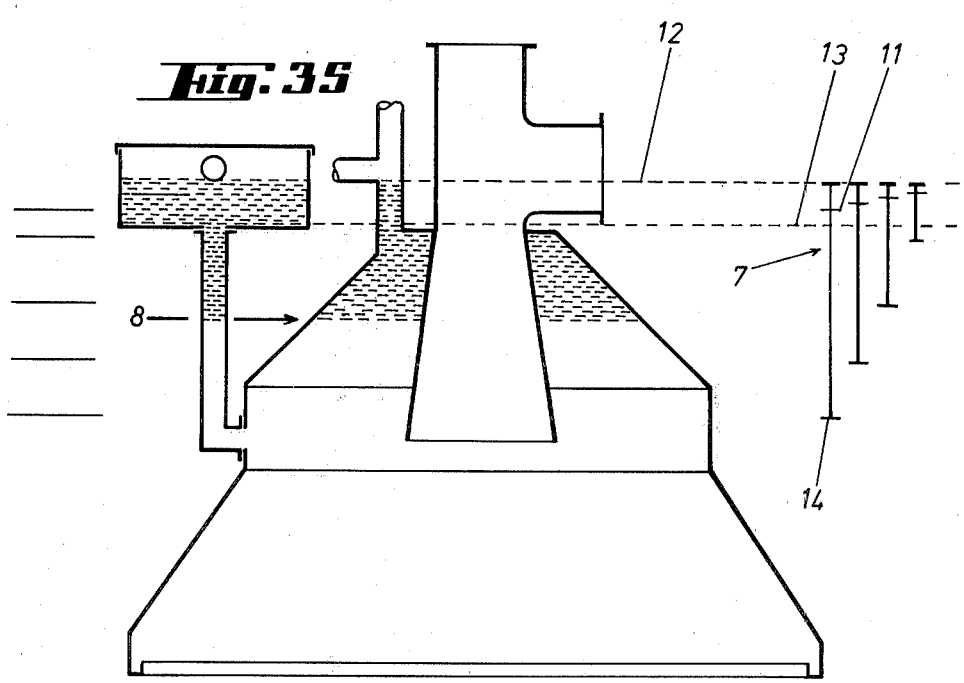

In FIG. 35 are the heights of the oil columns shown in scale with a density of 0.90. Thus the middle lines (11) indicate the respective water surface (H), that develops through the water level fluctuations.

The dotted line (12) shows the maximum height of the oil surface (h) and the dotted lines (13) show the maximum depth of the water level (H).

With the lower bar (14) is the displaced water level (H$_1$-oil base) inside of the dome indicated.

The differences in the water level (11), that develops through the different fluctuations (according to the flow quantities) amount respectively to 1 cm.

One compares the flow quantities or the displaced water level (H$_1$) so that the difference between 0.85 and 0.90 is evident.

In normal operation, the oil column is presumably moved beneath the water level on the line (8), however through corresponding height arrangement of the oil discharges, it can also be otherwise adjusted.

Figure 34:
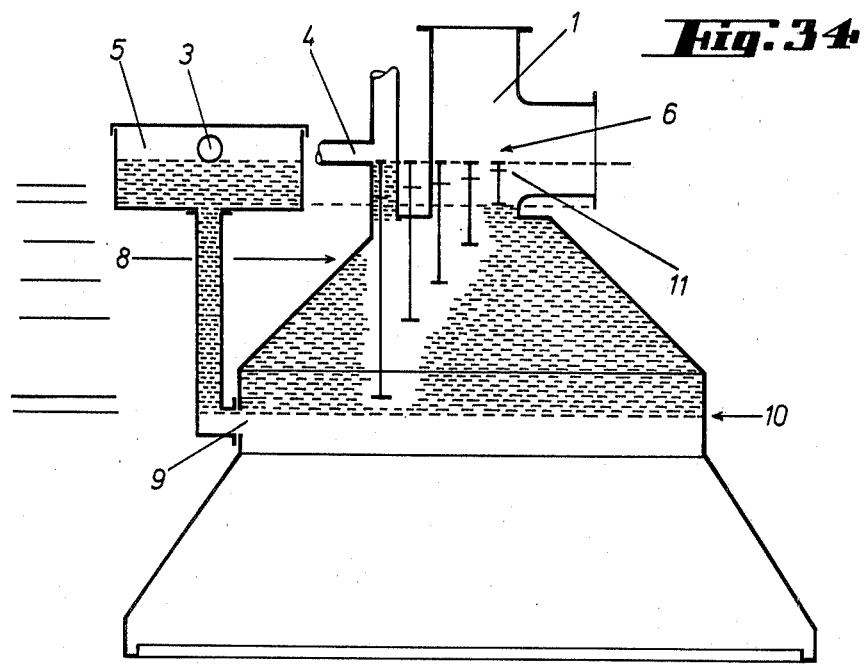
FIGS. 34 and 35 show operation of the separator.

The oil level illustrated in FIG. 34 can then be achieved if the discharge in the normal oil leakage is disturbed or the water level fluctuations do not exceed 3 cm or the flow in the continuous operation lies below approximately 0.150 l/s. Should, with the brief operation small amounts of oil below 0.150 l/s overflow, with the passage of time, however, a corresponding volume accummulate, so with the illustrated size, in the extreme case with higher established safety discharge, up to 7 liters oil can be expelled with the lowering of the water level in the dome and with a single fluctuation lift can be brought to discharge through the normal oil discharge.

In order to economize the function controls, the safety discharge can be so adjusted that also with a non-obstructed oil discharge the function of the warning apparatus can be confirmed. Horeover, through the arrangement of the container higher fluctuations have to be tolerated, because through the continued repetitions of the fluctuations, a pump effect is obtained.

The determination of the oil layer thickness and the carrying off of the oil can also be achieved while one so connects the immersion and rising pipe with cylindrical or funnel formed upwardly and downwardly open hollow bodies that the large volume occurs with the immersion pipe above in the region of the fluctuation and the rise pipe is arranged with the large volume downward. Thus the rise pipe likewise must lie in the region of the fluctuations.

What is claimed is:

1. A device for continuously separating the components of a liquid mixture of different specific weights, especially for separating a light liquid, as for instance oil or gasoline etc., from a heavy liquid, as for instance water, heavy substances or slurry, said device comprising:
    a container;
    a partition disposed in said container and separating the same into a separation chamber and a receiving chamber for the heavy liquid and providing a connection of the chambers in the lower container portion;
    an inlet for the liquid mixture into said separation chamber;
    an outlet for the heavy liquid from said heavy liquid receiving chamber and an outlet for the light liquid from the separation chamber disposed higher than the level of the heavy liquid;
    said separation chamber having at least one deflecting surface providing a narrowed sectional area of flow for the liquid mixture and opening into an area with large flow section, said deflecting surface being disposed in the upper portion of said separation chamber (1, 1', 69) to cause a substantially vertically downwardly directed liquid flow, said separation chamber having an area with large flow section disposed in the lower part (1, 1', 69) adjacent to the connection to the receiving chamber (2, 70) for the heavy liquid, said separating chamber having an area free of flow on the side of the deflecting surface opposite to the liquid flow serving as light liquid collecting chamber (21, 21') which includes the outlet (6) for the light liquid,
    said receiving chamber (2, 70) for the heavy liquid being a second separation chamber having a substantially greater volume than the first separation chamber and having a second light liquid outlet (6₁), and
    said heavy liquid outlet being defined by a baffle plate in said receiving chamber substantially spaced from the first separation chamber.

2. The device according to claim 1 wherein said deflecting surface is defined by a liquid inlet tube (3) conically enlarging downwardly, said inlet tube extending from above through the collecting chamber (21) for the light liquid to below the lowest level of the light liquid.

3. The device according to claim 2 wherein said partition is defined by a separating bell (1, 37) into which the liquid inlet tube (3, 25) is introduced from above.

4. The device according to claim 3 wherein said separating bell (1) is provided at its lower edge (12) with an oil drop duct.

5. The device according to claim 3 wherein a replaceable canister (54) with sealable openings for the inlet (51), for the heavy liquid outlet, for pressure compensation (50) and for the light liquid outlet (49) is used as separating bell (10).

6. The device according to claim 1 wherein said deflecting surface is defined by a trough-like basin (24) defining the narrowed sectional area of flow in connection with said partition (30).

7. The device according to claim 6 wherein said trough-like basin (24) has a double side wall defining a four-sided sluice and wherein said collecting chamber for the light liquid is provided in the four-sided pyramid-like space between said sidewalls.

8. The device according to claim 1 wherein said deflecting surface is defined by two deflecting members (72, 73; 72', 73') disposed at the liquid inlet and downwardly inclined.

9. The device according to claim 1 wherein said baffle plate is formed as a dip tube (8, 8').

10. The device according to claim 1 wherein a partition wall (31, 70', 70") is provided between said first separation chamber (1, 69) and said second separation chamber (2, 70).

11. The device according to claim 1 wherein the bottom (34, 71) of the second separation chamber (2, 70) is substantially inclined towards the heavy liquid outlet.

12. The device according to claim 1 wherein the horizontal cross-section of said receiving chamber (2, 70) is dimensioned such that a uniform settling process is carried out with a velocity in a range of 1.5–3 mm/s.

13. The device according to claim 1 further comprising a third separation chamber (7, 7') in connection with said heavy liquid outlet, and wherein a dip tube (9, 9') is introduced into the third separation chamber for discharging the heavy liquid from the same.

14. The device according to claim 1 wherein said light liquid collecting chamber includes a security outlet (6₃), and wherein a second security outlet is provided for use with light liquids of higher density than 0.90, said second security outlet being adjusted to the light liquid collecting level of the light liquid collecting chamber.

15. The device according to claim 1 wherein said light liquid outlet is further defined as a light liquid security outlet with warning system (74), said outlet comprising a container with partitions, a lateral tube with a light liquid inlet funnel (79) adjustable in height, a light liquid normal outlet (80), a light liquid security outlet (81) and a lever mechanism (82-83), said outlet being exposed to a heavy liquid level (75) of lower position which is independent of heavy liquid level variations, and wherein the light liquid column (78) forms downwardly, ascends after downwardly passing a partition and fills a cup (82) in passing to the security outlet (81), upon an interruption in the light liquid outlet (80), so that an oil alarm is produced.

16. The device according to claim 1 wherein the heavy liquid outlet has a rectangular cross-section.

17. The device according to claim 1 wherein a compensating collection basin (36') is defined by a sluice (27') in front of the heavy liquid outlet (36") by transforming the wide weir cross-section of said sluice into a round outlet cross-section at a lower position, wherein said sluice is supplied by a well or a rectangular tube, and wherein said sluice is provided with a round weir edge for acceleration of the flow velocity.

18. The device according to claim 1 wherein an angle tube (35) is provided with which the light liquid is introduceable into the first separation chamber (1), and in that the thickness of the light liquid layer at the angle tube (35) in the second separation chamber (2) is adjustable to a certain layer thickness by means of an adjustable dip tube.

19. The device according to claim 1 wherein a slurry partition (17) is disposed in front of the baffle plate of the heavy liquid outlet.

20. The device according to claim 1 wherein said device is provided with two cylinder-like or pyramid-like containers open at their upper and lower ends, of which an extremely tapered end is connected with the large volume end of the other container such that after assembly a large volume and a small volume end projects over the light liquid level, respectively, and in that the intersecting point of the tapering is immersed downwardly of the region of the level variation of the heavy liquid.

21. The device according to claim 20 wherein the immersed large volume end takes up the ascending oil or in that the large volume container terminates in the marginal range of the oil layer so that the oil enters under the lower edge of the container upon reaching of a certain oil layer thickness and is urged into the oil outlet by the variations of the water level.

22. The device according to claim 21 wherein the tapered upper end is connected with a conduit above the highest possible water level and in that the tapered lower end is connected with the large volume end of the other container.

* * * * *